US006165356A

United States Patent [19]
Carman et al.

[11] Patent Number: 6,165,356
[45] Date of Patent: Dec. 26, 2000

[54] IN SITU MICROBIAL FILTER USED FOR BIOREMEDIATION

[75] Inventors: M. Leslie Carman, San Ramon; Robert T. Taylor, Roseville, both of Calif.

[73] Assignee: The Regents of the University of California, Oakland, Calif.

[21] Appl. No.: 09/200,301

[22] Filed: Nov. 25, 1998

Related U.S. Application Data

[62] Division of application No. 08/706,152, Aug. 30, 1996, Pat. No. 5,888,395.

[51] Int. Cl.$^7$ ........................................................ C02F 3/34
[52] U.S. Cl. .......................... 210/150; 210/170; 210/606; 210/747; 435/262.5
[58] Field of Search ..................................... 210/606, 610, 210/611, 615–617, 631, 747, 150, 151, 170; 435/262.5, 281, 822, 858

[56] References Cited

U.S. PATENT DOCUMENTS

| | | | |
|---|---|---|---|
| 3,979,283 | 9/1976 | Prudom | 210/11 |
| 4,664,805 | 5/1987 | Focht | 210/611 |
| 4,725,357 | 2/1988 | Downing et al. | 210/611 |
| 4,992,174 | 2/1991 | Caplan et al. | 210/610 |
| 5,006,250 | 4/1991 | Roberts et al. | 210/610 |
| 5,037,551 | 8/1991 | Barkley et al. | 210/603 |
| 5,196,339 | 3/1993 | Hanson et al. | 435/262 |
| 5,246,584 | 9/1993 | Donaldson et al. | 210/603 |
| 5,362,397 | 11/1994 | Cyr | 210/610 |
| 5,487,834 | 1/1996 | Carman et al. | 210/606 |
| 5,910,245 | 6/1999 | Bernhardt et al. | 210/170 |
| 5,997,749 | 12/1999 | Citterbart et al. | 210/747 |
| 6,001,252 | 12/1999 | Rice et al. | 210/610 |

OTHER PUBLICATIONS

G. Rasul Chaudhry et al, Biodegradation of Halogenated Organic Compounds, *Microbiological Reviews*, 55:59–79 (Mar. 1991).

Sunghoon Park et al, Batch Cultivation of *Methylosinus trichnosporium* OB3b. I: Production of Soluble Methane Monooxygenase, Biotechnology and Bioengineering, 38:423–433 (1991).

Carl E. Cerniglia, Biodegradation of polycyclic aromatic hydrocarbons, *Biodegradation*, 3:351–368, (1992), Kluwer Academic Publishers, Netherlands.

Mark D. Mikesell et al, Metabolic diversity of aromatic hydrocarbon–degrading bacteria from a petroleum–contaminated aquifer, Biodegradation, 4:249–259, (1993), Kluwer Academic Publishers, Netherlands.

R. T. Taylor et al, In Situ bioremediation of trichloroethylene–contaminated water by a resting–cell methanotrophic microbial filter, *Hydrological Sciences (Journal–des Sciences Hydrologigues)*, 38:323–342 (1993).

D. R. Shonnard et al, Injection–attachment of *Methylosinus trichosporium* OB3b in a two–dimensional miniature sand–filled aquifer simulator, *Water Resources Research*, 30:22–35 (Jan. 1994).

S. Heald et al, Trichloroethylene Removal and Oxidation Toxicity Mediated by Toluene Dioxygenase of *Pseudomonas putida*, *Applied and Environmental Microbiology*, 60:4634–4637 (Dec. 1994).

M. L. Hanna et al, Attachment/Detachment and Trichloroethylene Degradation by Resting Cells of *Methylosinus trichosporium* OB3b, *Abstracts of the 95th General Meeting of the American Society for Microbiology*, Abstract Q–76, May 21–25 (1995), Washington, D.C.

(List continued on next page.)

*Primary Examiner*—Thomas G. Wyse
*Attorney, Agent, or Firm*—Alan H. Thompson

[57] ABSTRACT

An improved method for in situ microbial filter bioremediation having increasingly operational longevity of an in situ microbial filter emplaced into an aquifer. A method for generating a microbial filter of sufficient catalytic density and thickness, which has increased replenishment interval, improved bacteria attachment and detachment characteristics and the endogenous stability under in situ conditions. A system for in situ field water remediation.

23 Claims, 14 Drawing Sheets

OTHER PUBLICATIONS

Robert T. Taylor et al, Laboratory Treatability Studies for Resting–Cell In Situ Microbial Filter Bioremediation, *Bioaugmentation for Site Remediation*, 15–29, Eds. Robert E. Hinchee et al, Battell Press, Columbus, Ohio, (Sep. 1995).

Michael E. Witt et al, Bioaugmentation and Transformation of Carbon Tetrachloride in a Model Aquifer, *Bioaugmentation for Site Remediation*, 221–227, Eds. Robert E. Hinchee et al, Battell Press, Columbus, Ohio, (Sep. 1995).

Jens Aamand et al, Degradation of PAHs in Soil by Indigenous and Inoculated Bacteria, *Bioaugmentaion for Site Remediation*, 121–127, Eds. Robert E. Hinchee et al, Battell Press, Columbus, Ohio, (Sep. 1995).

Chi Y. Shin et al, Biodegradation of Trinitrotoluene (TNT) by a Strain of *Clostridium bifermentans*, *Bioaugmentation for Site Remediation*, 57–69, Eds. Robert E. Hinchee et al, Battell Press, Columbus, Ohio, (Sep. 1995).

Astrid E. Mars et al, Degradation of Toluene and Trichloroethylene by *Burkholderia cepacia* G4 in Growth–Limited Fed–Batch Culture, *Applied and Environmental Microbiology*, 62:886–891 (Mar. 1996).

Hai Shen et al, Microbial Reduction of Cr (VI) during Anaerobic Degradation of Benzoate, *Environ. Sci. Technol.*, 30:1667–1674 (1996).

Junko Munakata–Marr et al, Enhancement of Trichloroethylene Degradation in Acquifer Microcosms Bioaugmented with Wild Type and Genetically Altered *Burkholderia* (*Pseudomonas*) *cepacia* G4 and PR1, *Environ. Sci. Technol.*, 30:2045–2052 (1996).

Nilesh N. Shah et al, Batch Cultivation of *Methylosinus trichosporium* OB3b: V. Characterization of Poly–$\beta$–Hydroxybutyrate Production Under Methane–Dependent Growth Conditions, *Biotechnology and Bioengineering*, 49:161–171 (1996).

A. G. Duba et al, TCE Remediation Using In Situ, Resting–State Bioaugmentation, *Environ. Sci. Technol.*, 30:1882–1989 (1996).

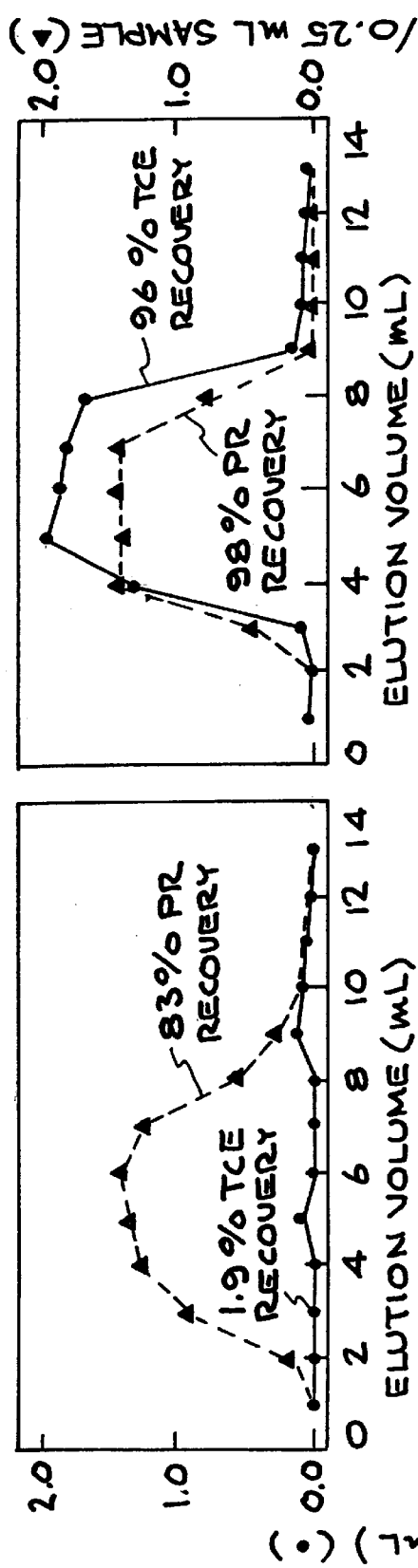
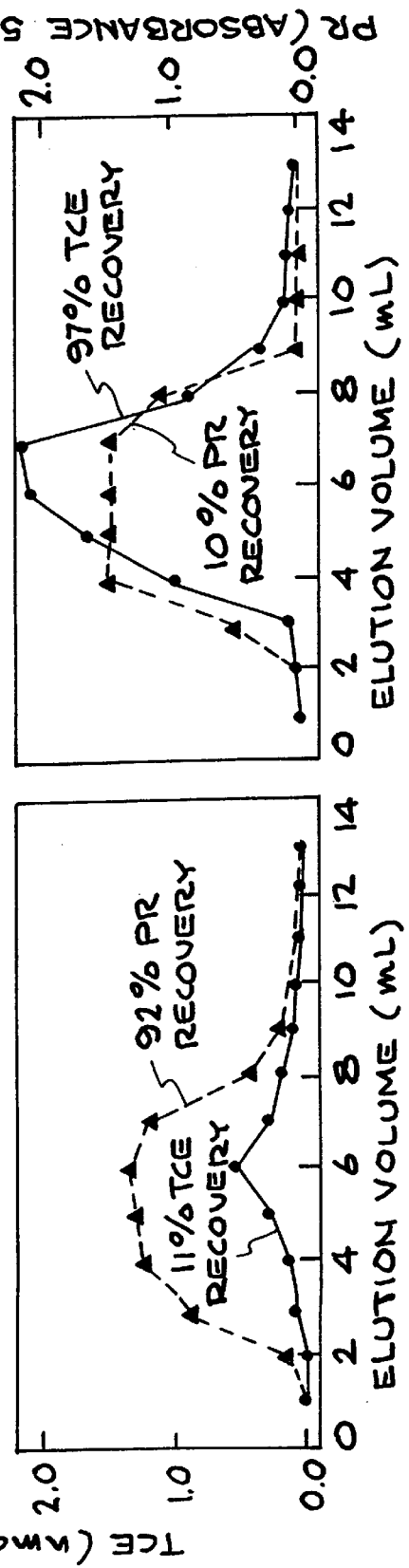
FIG. 8E
FIG. 8F
FIG. 8G
FIG. 8H

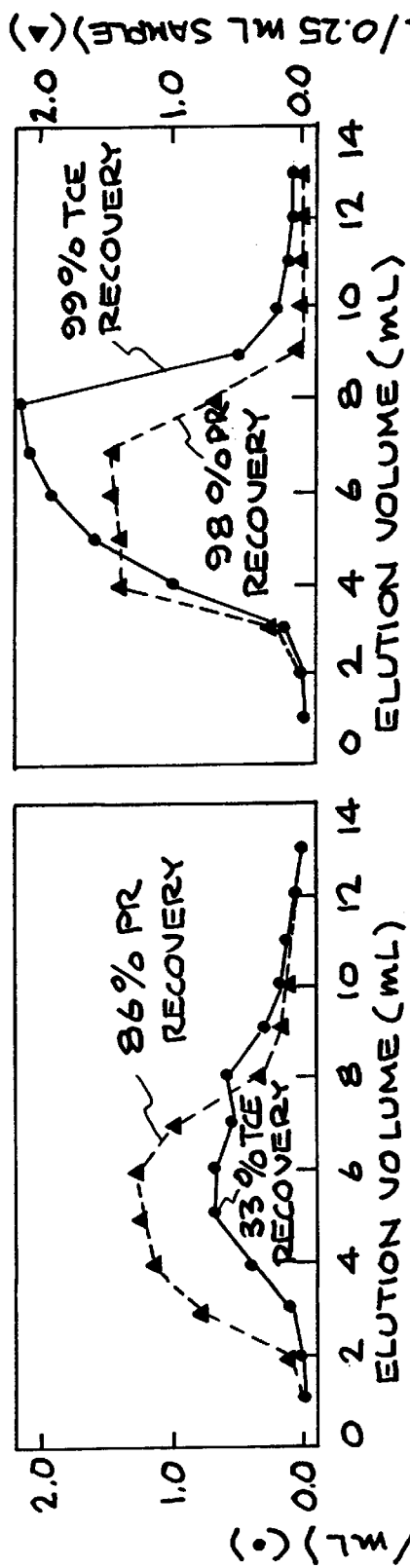
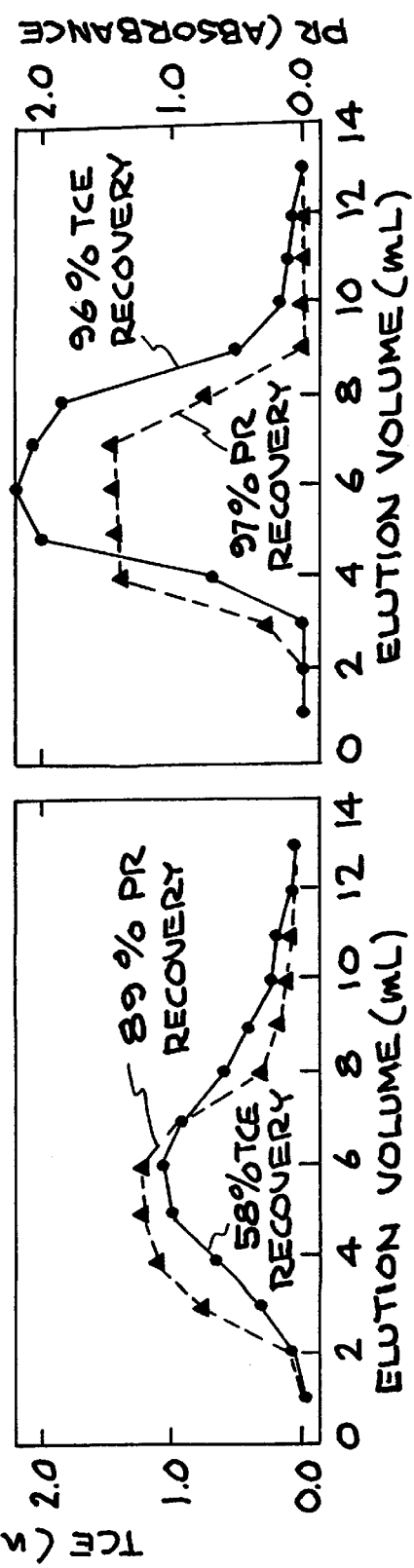
FIG. 8J
FIG. 8L
FIG. 8I
FIG. 8K

IN SITU MICROBIAL FILTER USED FOR BIOREMEDIATION

This application is a Division of application Ser. No. 08/706,152, filed Aug. 30, 1996, now U.S. Pat. No. 5,888,395.

The United States Government has rights in this invention pursuant to Contract No. W-7405-ENG-48 between the U.S. Department of Energy and the University Of California, for the operation of Lawrence Livermore National Laboratory.

BACKGROUND OF THE INVENTION

1. Field of the Invention

This invention concerns a method and a system for improved in situ bioremediation of groundwater by increasing the operational longevity of an in situ microbial filter emplaced in an aquifer. The longevity of the biofilter is increased by selecting a stable bacterial isolate and enhancing its longevity with one or more additives. In particular, this invention provides a method for producing a microbial filter of sufficient catalytic density and thickness, and for increasing the bacterial replenishment interval, via improved attachment and detachment characteristics of the cells and their endogenous catalytic stability under the devised in situ attachment conditions.

Attachment and detachment characteristics of the bacteria of the invention are enhanced by screening an otherwise pure homogeneous population of a single bacterial strain for stable isolates, preferably rosette cluster forming isolates, and improving these properties by modifications of the injection cell buffer.

The bioremediation system of the invention comprises a bioreactor for growing a biofilter of bacterial cells, a biofilter, a means for emplacement of the biofilter in situ in a contaminated water aquifer and a means for extracting remediated water through the biofilter.

2. Background and Related Art

Groundwater aquifers at many industrial, research and defense-related sites are often contaminated with chlorinated volatile organic compounds (VOCS). While "pump and treat" is currently the standard method for remediating these compounds, in situ bioremediation using bacterial filters described, for example, in *Geomicrobiol.*, 8: 133–146 (1991), continues to generate much interest.

Methanotrophic bacteria, containing the soluble form of methane monooxygenase (sMMO), are known to oxidatively degrade a number of chlorinated aliphatic hydrocarbons, including trichloroethylene (TCE) (*Appl. Environ. Microbiol.*, 57: 228–235 and 1031–1037 (1991)). A specific in situ microbial filter approach described in *Hydro Sci. J.*, (IAHS), 38: 323–342 (1993) utilizes resting-state (nondividing) cells of the methanotroph, *Methylosinus trichosporium* OB3b. In this filter strategy, cells that have been previously grown in a bioreactor are injected into the subsurface ahead of a dilute, migrating contaminant plume. Ideally, as the contaminated groundwater flows into this zone, the attached microbial population degrades the contaminant(s) at a rate that keeps pace with the rate of transport, and the groundwater then exits clean. However, an in situ pilot field test of a *M. trichosporium* OB3b filter, used for a narrow, shallow, fast moving TCE plume at a contaminated site revealed that the microbial filter had only short term longevity (several days), in terms of an efficient removal of TCE, and therefore, very limited utility in groundwater remediation (*Environ. Sc. Technol.*, 30: 1982–1989 (1996). Need for frequent replacement of the filter biomass makes this treatment method uneconomical and impractical.

To be economically viable and operationally achievable in the field, the in situ microbial filter will have to degrade TCE and several other chlorinated ethanes over a period of several weeks before it is replenished. Several parameters influence the filter's ability to achieve this: the finite biotransformation capacity of the attached resting cells for contaminants, the attachment/detachment properties of the injected bacteria with respect to the natural geological sediments or an introduced in situ sand trench and the long term endogenous stability of the whole-cell sMMO activity. Without improved and enhanced functional or operational longevity, the whole-cell rate of hydrocarbon contaminant catalysis and the biotransformation capacity would decay too rapidly to extremely low values over time. This, in turn, would prove to be impractical for in situ bioremediation applications.

Therefore, it would be desirable to provide a laboratory-based predictive methodology for creating an economical bacterial filter at a field site, a biofilter having an improved and enhanced longevity that would allow a continuous remediation without a need to replace the microbial filter more than once in about 6–8 weeks.

Because bacteria are particles, the colloid filtration theory provides a basis for studies of cell transport through saturated, subsurface media. Advection, dispersion, deposition, and entrainment are all processes that can influence this movement (*Geomicrobiol.*, 8: 133–146 (1991)). Yet overall, it is generally accepted that cell surface hydrophobicity and cell/solid electrostatic interactions are the most important factors which influence bacterial deposition onto, and retention by, aquifer sediments. Experimentally, physical properties (e.g., grain size) as well as chemical properties (ionic strength and pH) have been shown to influence the attachment density of bacteria to aquifer sands and mineral surfaces. Generally, an ionic strength of ~0.01 molal is needed to promote maximal attachment, but the process is not electrolyte specific. Additionally, chemical alterations of both the aqueous and solid media and of the bacterial cell surface can be quite important. For example, it has been reported that Mg and Fe oxide coatings of aquifer sands increase bacterial attachment (*J. Contam. Hydrol.*, 6: 321–336 (1990).

While the need for improved microbial filter remediation of contaminated groundwater persists and while attempts at providing a means for such improved remediation have been made, due to a short lifespan of available microbial filters, such remediation efforts have not been successful.

It would be, therefore, advantageous to provide validatable methods and simulated conditions that would permit an increased longevity of any specific bacteria that might be used for an in situ microbial filter, especially as it relates to enhancing their attachment and detachment properties.

It is therefore a primary objective of this invention to utilize the resting-state *M. trichosporium* OB3b cells or other bacteria having improved attachment and detachment properties as an in situ biofilter for the treatment of ground water containing a chlorinated hydrocarbon contaminant, such as a TCE-contaminated plume.

All patents, patent applications and publications cited herein are incorporated by reference.

SUMMARY

One aspect of this invention is an improved in situ validatable bioremediation method for sites contaminated with hydrocarbons in general and with chlorinated aliphatic hydrocarbons, in particular.

Another aspect of this invention is a validatable bioremediation method using an emplaced microbial filter having an improved and enhanced longevity due to increased attachment and decreased detachment properties.

Still another aspect of this invention is a microbial filter useful for in situ remediation wherein the microbial filter is created using a stable isolate of an otherwise pure strain of *M. trichosporium* OB3b, wherein the stable isolate is selected by initial pre-screening of a *M. trichosporium* OB3b culture for the isolate able to form rosette clusters.

Another aspect of this invention is a modified medium allowing a growth of bacterial strains having an improved and enhanced longevity due to increased attachment and decreased detachment properties.

Still another aspect of this invention is a modified suspension media for bacterial strains having an improved and enhanced longevity due to increased attachment and decreased detachment properties.

Yet another aspect of this invention is an improved bioremediation method comprising using an emplaced microbial biofilter having a increased half-life to about and over 8 weeks.

Still yet another aspect of this invention is a bioremediation system comprising a bioreactor for growing a sufficient biomass of bacterial cells to form an emplaced biofilter, a biofilter, a means for emplacement of the biofilter in situ in contaminated water aquifer, and a means for extraction of water through the biofilter.

Another aspect of this invention is a laboratory method for predicting, designing and optimizing conditions for field water remediation taking into consideration the field conditions, such as a type of a contaminant, pH, temperature, soil type, dissolved oxygen and inherent properties of the bacterial strain or its substrain.

Still yet another aspect to this invention is a method for bioremediation of contaminated groundwater by biodegradation of contaminants using an emplaced microbial biofilter, said method comprising steps:

(a) selecting a bacterial strain able to biodegrade a water contaminant to be emplaced as a microbial biofilter for the biodegradation of the water contaminant using a laboratory method for predicting, designing and optimizing conditions for bioremediation according to the invention;

(b) cultivating said bacterial strain to a cell biomass having increased longevity by increasing the attachment and decreasing detachment rate of the biofilter;

(c) emplacing said microbial biofilter at a site of a contamination; and (d) extracting the contaminated groundwater through the microbial biofilter;

wherein the bacterial strain is selected from the group of bacteria such as methanotrophic bacteria possessing an enzyme such as oxygenase or enzymatic system such as monooxygenase system able to biodegrade the contaminant, and wherein such bacteria is preferably a rosette clusters forming isolate of *Methylosinus trichosporium* OB3b strain;

wherein the bacteria is pregrown on nitrate minimal salt medium lacking copper to the cell biomass having a density necessary to biodegrade the contaminant for at least 8 weeks;

wherein said cell biomass is emplaced as the biofilter in an aquifer by suspending the cell biomass in an injection medium substituted with additives such as magnesium salts, ferrous salts and agar.

Still yet another aspect of the current invention is a system for bioremediation of contaminated water comprising components:

(a) a means including a laboratory method for identification of stable bacterial isolates able to form rosette clusters and their separation from the isolates not having such ability;

(b) a surface bioreactor for growth of sufficient biomass of selected isolate;

(c) a mixing chamber wherein the cells or cell paste of the selected isolate is suspended in water and additives are added;

(d) an injection apparatus for the biofilter formation in situ;

(e) a microbial biofilter emplaced in situ;

(f) a means for extraction of water through the biofilter; and (g) a means for monitoring purity of the remediated water;

wherein the bioreactor further contains a means for controlling the temperature, pH, nutrients supply and oxygen or other gas needed for bacterial growth;

wherein preferably the injection apparatus is an injection pump and the cell suspension is injected through existing injection or extraction wells into the aquifer to form an emplaced attached biofilter having the density and thickness to assure a longevity and functionality of the biofilter for at least about 8 weeks.

Still another aspect of the current invention is a laboratory method for prediction, design and optimization of conditions for field bioremediation said method comprising steps:

(a) determining pH, dissolved oxygen, temperature and soil type of a contaminated site aquifer;

(b) determining an identity of a contaminant and a degree of contamination;

(c) selecting a bacteria able to biodegrade said contaminant for an emplaced biofilter;

(d) determining attachment/detachment properties of the selected bacteria under the conditions of step (a);

(e) designing an injection buffer composition and additives for optimization of the biofilter emplacement, its longevity and functionality;

(f) confirming the designed conditions optimization with attachment/detachment assays followed with metabolic assays;

wherein said selection method of step (c) comprises comparing rosette forming isolates among themselves as well as comparing them to single cell isolates using the attachment assay, submitting all investigated isolates to a treatment with a single additive or a combination of additives, testing said isolates in the detachment assay, selecting the most stable isolate and determining the isolate's longevity.

Still yet another aspect to the current invention is a biofilter suitable for emplacement into a contaminated groundwater aquifer for biodegradation of a water contaminant comprising a bacterial cell biomass wherein said bacteria are able to biodegrade the contaminant and the biofilter has a longevity at least 8 weeks;

wherein preferably the bacterial cell biomass comprises a bacterial strain selected from the group of bacteria possessing an enzyme such as an oxygenase or enzymatic system such as a monooxygenase system able to biodegrade the contaminant;

wherein the bacteria is preferably a *Methylosinus trichosporium* OB3b rosette clusters forming isolate.

BRIEF DESCRIPTION OF FIGURES

FIGS. 1A, 1B and 1C show the actual field data using the bioreactor method.

FIGS. 8A through 8L, inclusive, are graphs showing the degradation of weekly TCE pulses for 15 weeks by the rosette forming isolate *M. trichosporium* OB3b.

DEFINITIONS

Figure 1A:
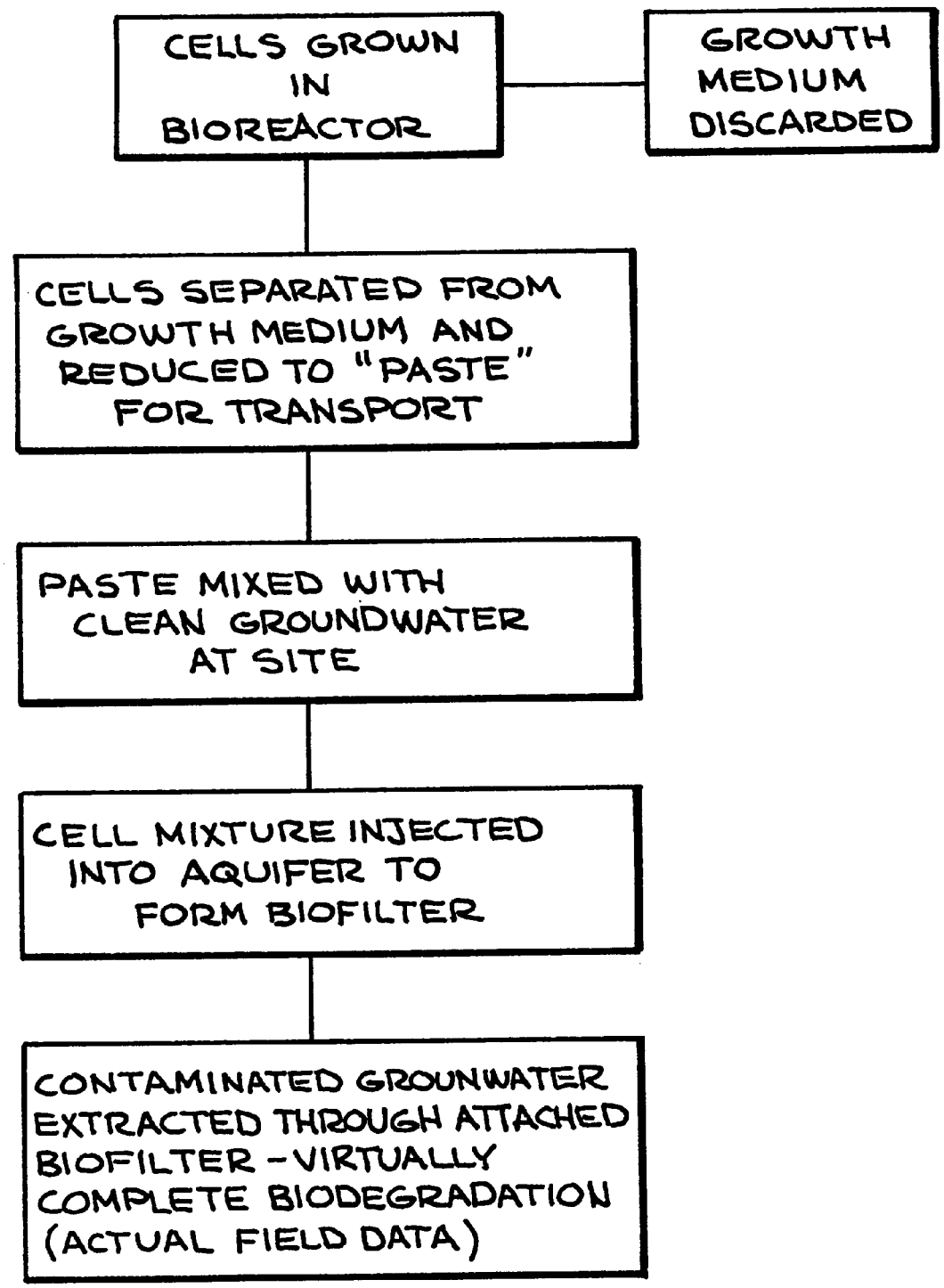
FIG. 1A is a schematic for the creation of an in situ biofilter in the intermediate subsurface region surrounding a single vertical well.

As used herein:

"Methanotrophs or methanotrophic" means an aerobic bacteria that have the ability to obtain both their energy and their carbon for their growth by oxidizing methane gas. Some methanotrophs when precisely cultured in the absence of copper contain exclusively the soluble form of methane monooxygenase.

"sMMO" means soluble form of methane monooxygenase.

"Contaminant" or "contaminants" means different types of contaminants currently known to be readily susceptible to bacterial biodegradation or biotransformation, such as petroleum and coal-derived hydrocarbons and their derivatives, halogenated aliphatics including trichloroethene (TCE), halogenated aromatic and nitroaromatics. These contaminants may be transformed by either aerobic or anaerobic bacterial processes, as described in *Microbiological Reviews*, 55: 59–79 (1991).

"Biofilter", "filter", "attached cell filter or biofilter" or "microbial filter or biofilter" means a mass of bacteria, preferably methanotrophic bacteria emplaced in the aquifer and able to biodegrade the volatile organic contaminants (VOCs). The biofilter is also meant to encompass other types of bacteria such as bacteria possessing oxygenase enzyme systems within several genera of aerobic microorganisms able to cometabolize TCE in an aerobic process. Examples of these bacteria are *Pseudomonas cepacia* G4 possessing the toluene-ortho-monooxygenase system and *Pseudomonas putida* F1 possessing the toluene dioxygenase system. Other candidates for the biofilter are several different types of indigenous bacteria, such as Pseudomonas, Arthrobacter, Mycobacterium, and Rhodococcus, which can use a variety of polycyclic aromatic hydrocarbons (PAHs) as a source of carbon and energy; anaerobic bacteria, such as *Clostridium bifermentans* CYS1 which anaerobically degrades high explosives such as trinitrotoluene (TNT), hexahydro-1,3,5-trinitro-1,3,5-triazine (RDX), and octahydro-1,3,5,7-tetraazocine (HMX) to non toxic aliphatic end products; Pseudomonas sp. strain KC able to transform carbon tetrachloride (CT) to carbon dioxide, formate, and nonvolatile end products; and other anaerobic microorganisms such as for example, *Desulfovibrio vulgaris* capable of the reductive biotransformation of metals such as for example Cr(VI), Fe(III), Mn (IV), Se (VI), to their less toxic reduction products.

"Rosette forming" or "rosette isolate" means a substrain of an otherwise pure homogenous strain of *M. trichosporium* OB3b6 which can be isolated as a separate colony by agar plating, but when it is repeatedly cultured it propagates mainly as clusters of cells, as opposed to a single cell form.

"Attachment" means chemical or physical bacterial association with sand or other natural subsurface sediments after a standard loading method.

"Detachment" means bacteria eluting with time from sand or other natural subsurface sediments after the standard attachment assay.

"Additives" means any compounds or a mixture thereof added either to the growth medium for growing a cell biomass or any compound added to an injection buffer for a biofilter emplacement. Typically, the additives will include media and agars used for culturing the bacterial cells which are commercially available and which can be used unsupplemented or supplemented with other additives. The additives also means various buffers suitable for growth of bacterial cells or for their maintenance. These buffers would typically have pH from about 4.3 to about 8.5, preferably from about 7.0 to 7.8 and most preferably from about 7.4 to 7.6. Additives also include salts, minerals, vitamins, enzymes catalysts and any other compound which will promote growth and stability of the bacterial cell isolates, increase their attachment or decrease their detachment. Exemplary medium is Higgins' nitrate minimal salts medium lacking Cu. Exemplary buffer is a phosphate buffer. Exemplary salts are nitrous, ferrous, nickel, molybdenum, potassium, sodium, calcium, copper and zinc chlorides, sulfates, phosphates as well as oxides and other compounds. Additives are meant to encompass any and all compounds which will aid in the method of the invention and promote the cells growth and stability.

"Higgins'" or "Higgins' phosphate buffer" or "HPB" means 0.01 M phosphate buffer (pH 7.5) used in the culture medium to grow the bacteria, *M. trichosporium* OB3b.

"Modified Higgins' salts medium" or "(MHS)" means Higgins' nitrate minimal salts medium (NMS) described in *Biotechnol. Bioeng.*, 38: 423–433, (1991) prepared by doubling the nitrate and Fe concentrations to 20 mM and 80 $\mu$m, respectively, raising the concentration of $Na_2MoO_4 2H_2O$ 40-fold to 16 $\mu$m, and adding 7.5 $\mu$M $NiCl_2 6H_2O$ according to *Hydrological Sci. J.*, 38: 323–342 (1993).

"Validatable" means able to be validated.

"VOC" means volatile organic compounds such as benzene, toluene, hexane, xylene and others.

"Resting cells" means metabolically active, but non-dividing bacteria.

DETAILED DESCRIPTION OF THE INVENTION

The current invention provides a method and a system for improved in situ water bioremediation using microbial filter having extended functional longevity, emplaced in a contaminated aquifer. The method involves creating the microbial filter in situ by selecting a stable isolate of an appropriate pure bacterial strain, increasing the bacterial isolate's density and the attachment properties and decreasing the detachment rate of the isolate cells, thereby increasing the operational longevity of an in situ emplaced microbial filter.

The filter is preferably formed of methanotrophic aerobic bacteria that have the ability to obtain both their energy and their carbon for growth by oxidizing methane gas. Methanotrophs when cultured in the absence of copper have been found to contain exclusively the soluble form of methane monooxygenase. Isolates of other bacteria, such as those listed in definitions may be similarly used if they possess the same biodegradative activity toward the contaminant(s) of interest and if they can be cultured is a stable form.

The method generates a microbial filter of sufficient catalytic density and thickness having improved cell attachment and detachment characteristics, wherein the acceptable overall operational longevity of the microbial filter is extended from a few days to about and preferably over 8 weeks.

Attachment and detachment characteristics of the bacteria of the invention are enhanced by the selection of the microbial strain isolate or its substrain which is able to form rosettes isolate and by modification of the injection cell buffer. The bioremediation method according to the invention is enhanced by the parallel development of quantitative and predictive assays that simulate attachment/detachment and operational longevity performance in the field which allow laboratory testing of these features before the method is applied in the field.

The bioremediation method is economical as well as practical and safe. The economic feasibility of the in situ microbial filter is dependent on its operational longevity, which in turn is dependent on several key parameters. Among these parameters are the bacterial attachment densities reached during the injection of the microbial suspension and the subsequent detachment-removal of cells from the filter over time.

Briefly, according to the invention, in situ microbial bioremediation of aquifers contaminated with chlorinated aliphatic VOCs or other contaminants is achieved with an in situ biofilter using pregrown, resting microbial cells able to form cluster rosettes or otherwise change their attachment/detachment properties resulting in enhanced longevity.

The in situ methanotrophic filter strategy in this invention utilizes pregrown resting cells, such as *M. trichosporium* OB3b isolated as a substrain of the original strain. These cell are identified and selected because of their ability to be cultured indefinitely in a form having enhanced attachment properties, such as ability to be cultured in a rosette cluster form. These cell are then grown on a suitable inorganic salts medium promoting the growth of the selected cells strains or substrains, or on a modified medium, such as for example medium lacking certain metal component, preferably copper, in case of *M. trichosporium* OB3b. These conditions should be such that the attachment of the cells or cell clusters suspensions to wet saturated sand is increased by approximately 2-fold versus that of the parent strain or single cell non-cluster suspensions.

The attachment then is further increased another 2-fold by an appropriate modification of the cell or cluster suspension loading buffer, preferably by addition of a magnesium salt, ferrous salt and dilute agar. These modifications in the medium and buffer result in further increasing the attachment half-life of the microbial biofilter generated using rosette-clusters or other cells having enhanced attachment properties. The half-life and the longevity of the biofilter is extended by slowing the time-dependent detachment rate from about 1 week to and over 8 weeks.

Improvements and the quantitative assays developed for the purposes of this invention and described herein make the microbial filter remediation feasible for decontamination of large volumes of flowing underground aquifers. Using the method of the invention, the contaminants present in the aquifer are biodegraded by microbial cometabolic action to unharmful components and, consequently, the aquifer water may be used or discharged without need for further processing and purification.

I. Microbial Biofilter Remediation

The microbial biofilter remediation according to the invention and the success of a resting cell biofilter strategy in the field is dependent on creating a microbial filter of sufficient catalytic density and thickness so that the residence time of the filter in situ provides the desired amount of contaminant degradation before the filter needs to be replenished. The utility and economic feasibility of such emplaced microbial filter depends on the microbial biomass replenishment interval which should be at least about 8 weeks, or preferably longer.

The replenishment interval depends on
1) the biotransformation capacity of the cells for the contaminant;
2) the attachment/detachment characteristics of the bacteria; and
3) the endogenous stability of the enzymatic system cometabolizing the contaminant of the attached whole-cell.

In case of *M. trichosporium* OB3b, the replenishment interval depends on the stability of the soluble methane monooxygenase (sMMO) enzyme system under the in situ filter conditions.

The method and the system for the microbial biofilter remediation are illustrated in FIGS. 1–9.

A. Method for Microbial Filter Remediation

The invention in one aspect concerns a method for bioremediation of contaminated groundwater by biodegradation of the contaminant using an in situ emplaced microbial biofilter.

Typically, the method of the invention comprises selecting a stable isolate of the bacterial strain able to biodegrade a water contaminant in the laboratory and determining its properties, i. e. its longevity, vis-a vis a water contamination and the degree of the contamination. The selected isolate is cultivated to a cell biomass needed to create an emplaced biofilter having increased longevity to at least but preferably over 8 weeks by increasing the attachment and decreasing the detachment rate of the biofilter. The cell biomass is then emplaced in situ as a microbial biofilter for the biodegradation of the water contaminant. The biofilter is typically emplaced in aquifer by suspending the cell biomass in an injection medium substituted with selected additives promoting its growth, stability, attachment and detachment. Typically, the injection medium is substituted with magnesium salts, ferrous salts and with agar added in concentration from about 0.0075% to about 0.025% on a dry weight/0.01 M phosphate buffer (HPB) volume basis. The contaminated groundwater is extracted through the microbial biofilter by typically pumping the water out of the contamination site through the filter.

Figure 1B:
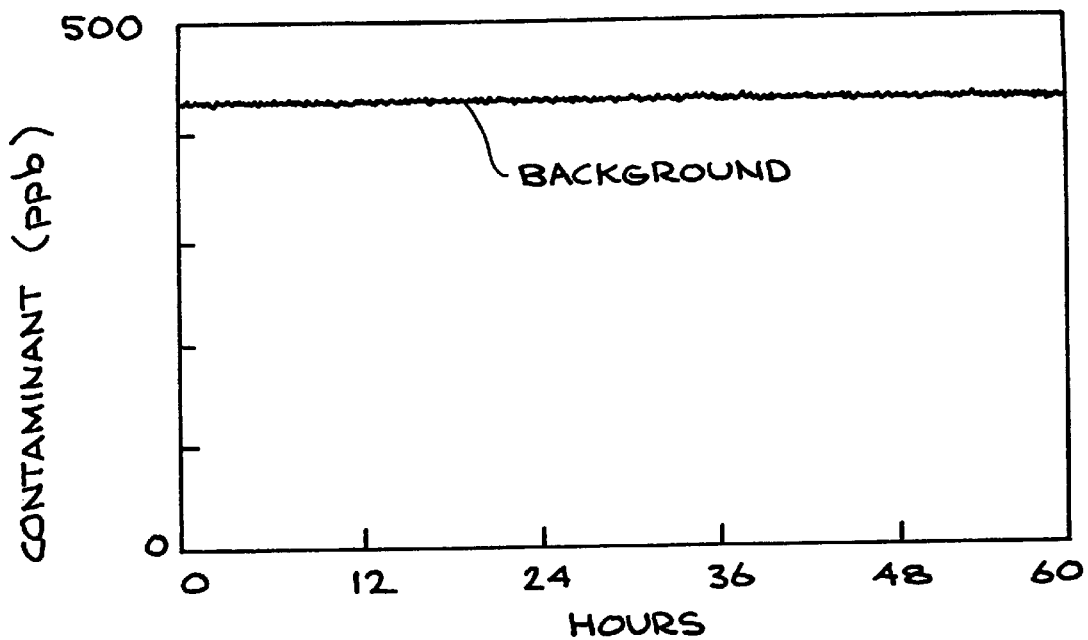
Figure 1C:
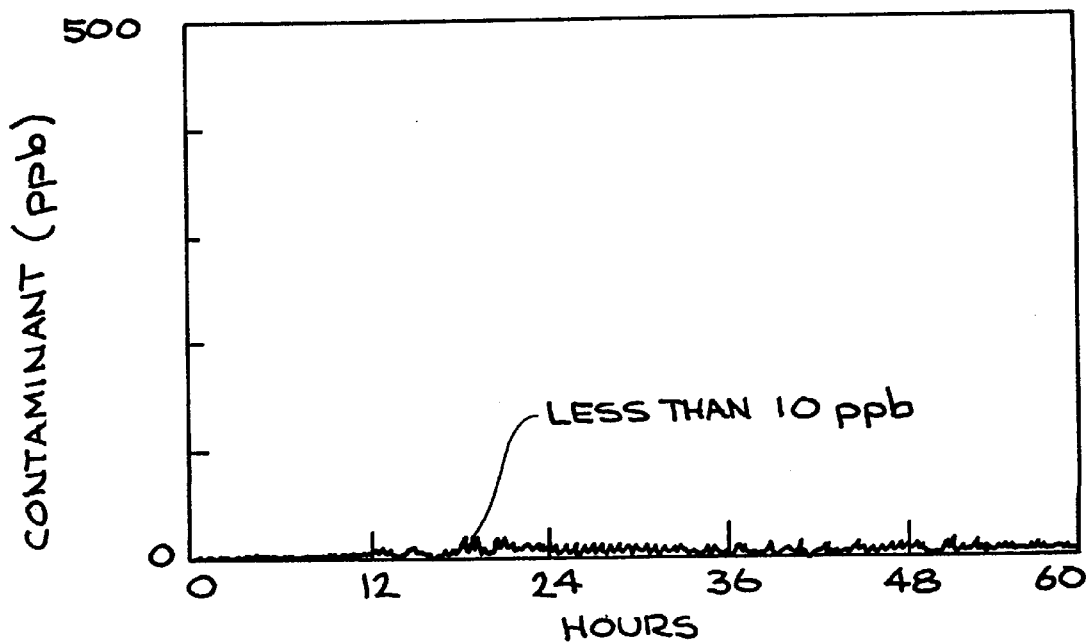

Implementation of the resting-cell in situ microbial biofilter according the invention, utilizing as exemplary bacteria a cluster form of *M. trichosporium* OB3b, is seen in FIGS. 1 and 2.

FIG. 1A is a schematic flow-chart of the present in situ biofilter remediation method and a system. In practice of the invention, the biofilter bacteria, preferably methanotrophs, are first grown for several weeks in a large surface bioreactor (Step 1) in a nitrate minimum salt medium, preferably Higgins' medium lacking copper, at temperature from about 20° C. to about 35° C., preferably under a methane/air gas mixture. Rosettes populations are then separated from the medium according to the procedure of the Example 1. Growth medium is then discarded. The rosette cluster forming cells are used for the biofilter formation. These cells are preferably reduced to paste, and transported to the bioremediation site (Step 2). During transportation the cells are preferably chilled. The cells or cell paste are mixed and/or evenly suspended in water supplemented with additives such as magnesium and ferrous salt and agar at the site of contamination (Step 3) and the cell suspension is injected (Step 4) through the well, such as cell injection or groundwater-extraction well, into the aquifer to form an emplaced attached biofilter (arrow). Remediation via the microbial filter proceeds in situ (Step 5) by extracting the decontaminated groundwater through the attached biofilter. The extracted water is tested for residual contaminants.

The actual field data using the bioreactor method obtained in field testing are shown in FIGS. 1A and 1B. As seen in insets 1 and 2, virtually complete removal of the initial contamination (background in FIG. 1A) is accomplished. Groundwater originally containing about 430 part-per-billions (ppb) contaminants (FIG. 1A), is remediated to contain less than 10 ppb of contaminant (FIG. 1B).

Figure 2A:
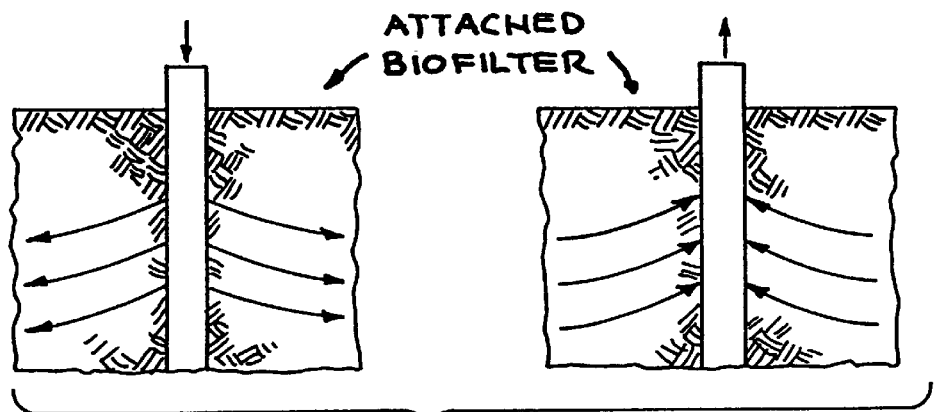
FIGS. 2A, 2B and 2C are a schematic of an in situ bioremediation method that depends on an improved microbial filter, which is created and implemented in three different configurations FIGS. 2A, 2B, and 2C. Configuration C involves the emplacement of a sand trench.
Figure 2B:
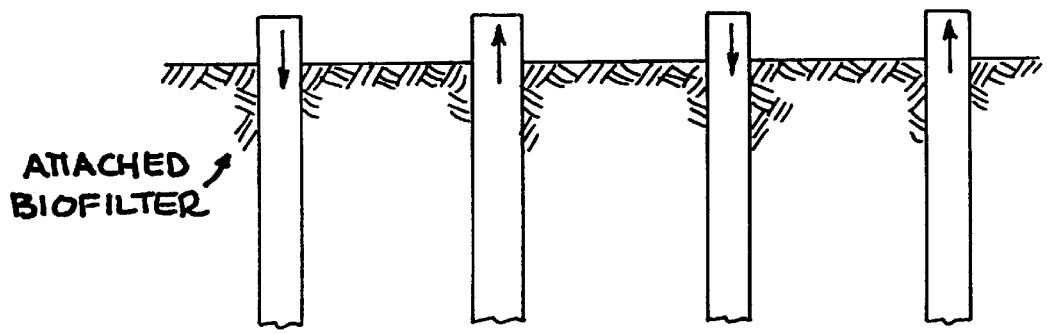
Figure 2C:
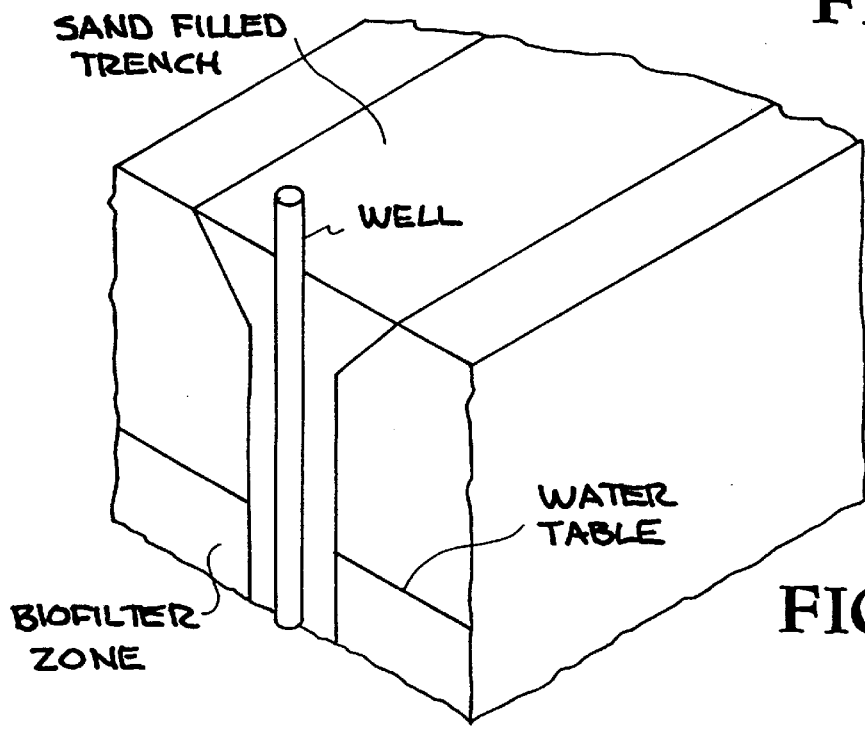
Figure 2D:
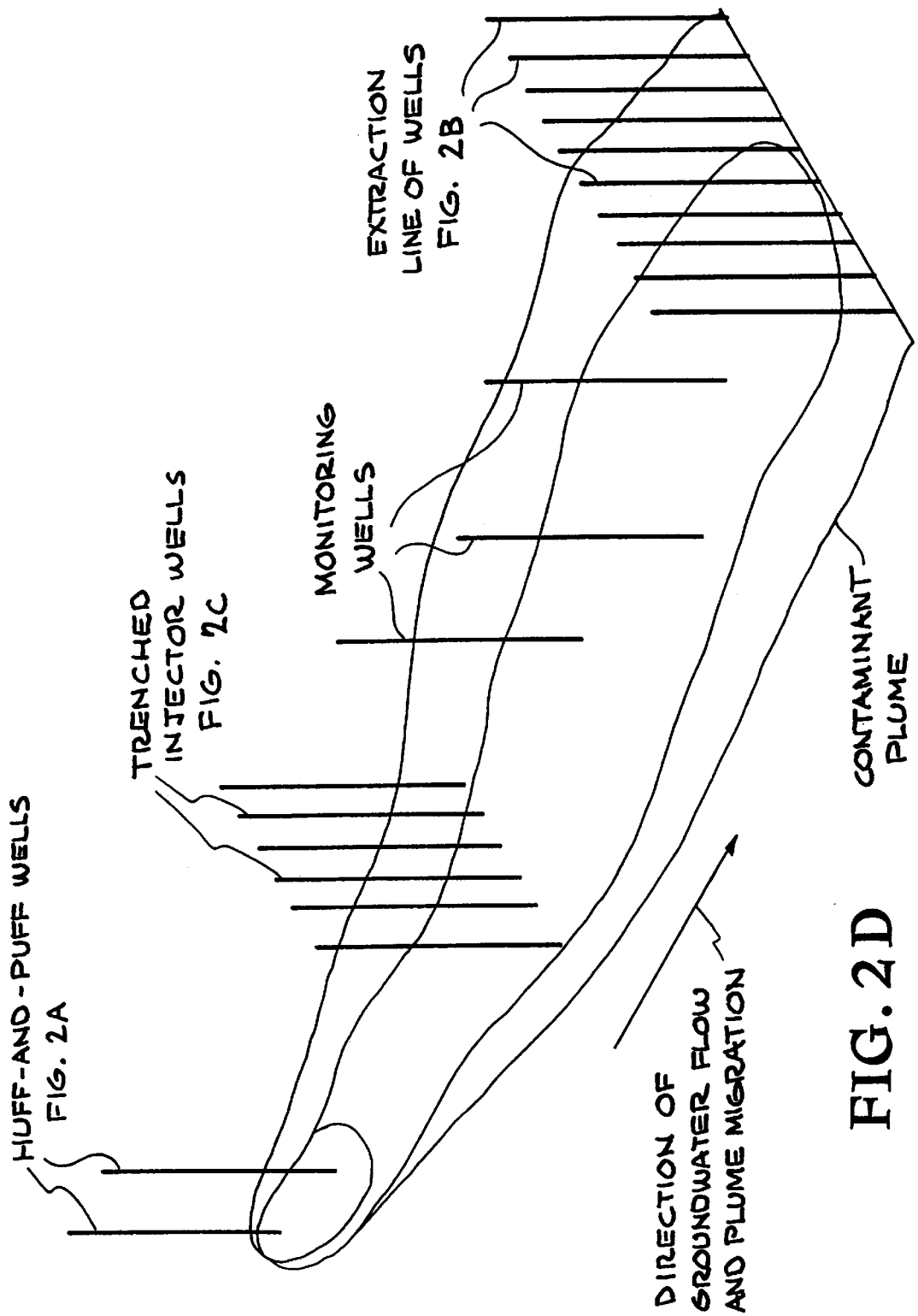
FIG. 2D shows a line-of-wells including those of FIGS. 2A, 2B and 2C.

In the remediation biofilter method, further illustrated in FIGS. 2A, 2B, 2C and 2D, the attached-cell microbial filter can be configured and emplaced in any one of several ways. The filter can be emplaced at the beginning of the plume as a cylindrical zone around a single injection well also known as a Huff-and-Puff emplacement (FIG. 2A); as a linear wall created with a line-of-wells for injection and withdrawal, in natural heterogenous subsurface media (FIG. 2B); or as a linear wall produced within an introduced homogenous sand filled trench (FIG. 2C) via a line-of-wells positioned in the saturated sand as seen in FIG. 2D. Contaminated water from any one of these well configurations is pumped through the filter in the direction of groundwater flow and plume migration. The filter cometabolizes the contaminant(s) and decontaminated water is run through monitoring wells as seen in FIG. 2D.

Regardless of its configuration, the success of the attached biofilter system in the field is dependent on creating a biofilter of sufficient catalytic density and thickness so that the residence time of the filter in situ gives the desired amount of contaminant degradation. Contaminant degradation is a capability of the attached biofilter to achieve a contaminant biotransformation. Biotransformation capacity of the microbial filter is determined by the attachment of the biofilter to the aquifer sand or rock, by the detachment characteristics of the bacteria, and by the endogenous stability of soluble methane monooxygenase enzyme system of the attached biofilter cells under the in situ filter conditions.

Improving any of these parameters increases the longevity of the biofilter and decreases the cost of operating the filter by lengthening the attached bacterial replenishment interval.

This invention, therefore, concerns the discovery that the biofilter made with rosette clusters of the selected bacteria, rather than single cells in suspension, and then treated with additives in a special way during the biofilter creation, extends the operational utility time of the filter from about 1 week up to about and over 8 weeks.

B. Microbial Biofilter

The invention provides a microbial biofilter suitable for long-term emplacement into a contaminated groundwater aquifer for biodegradation of a water contaminant. The biofilter is created by emplacing a cell biomass of a selected stable isolate of the bacteria able to biodegrade the contaminant. The biofilter biomass and properties of the bacterial isolate extend the biofilter's longevity to at least but preferably over 8 weeks.

The biofilter typically is made of the isolate of a bacterial strain possessing an enzyme or enzymatic system able to biodegrade a specific contaminant. For most harmful and common underground water contaminants, such as hydrocarbons, the biofilter utilizes a bacterial strain possessing an oxygenase or monooxygenase system, such as methane monooxygenase. The parent bacteria possessing such an enzymatic system are methanotrophic. Representative of these bacteria on which the invention was tested and developed is *Methylosinus trichosporium* OB3b strain. This strain has now been shown to contain a rosette clusters forming isolate which has an extraordinary ability to survive underground and to cometabolize the contaminants for extended periods of time.

The biofilter of the invention is preferably the *Methylosinus trichosporium* OB3b stable isolate, pregrown on nitrate minimal salt medium lacking copper to the cell biomass having a density necessary to extend a half-life of the biofilter for at least 8 weeks.

The microbial biofilter of the invention utilized in the subsurface bioremediation method of the invention thus consists of the biomass of attached bacterial cells clusters having specific metabolic biodegradative capabilities allowing metabolic degradation of the contaminants of concern. Examples of suitable bacteria are *M. trichosporium* and other methanotrophs, and a number of other bacteria listed in definitions which are useful for the oxidation or other chemical biodegradation of chlorinated aliphatic hydrocarbons or other contaminants as listed in the definitions. However, other non-listed bacteria possessing similar biodegradative properties under the conditions and in the system of this invention are also intended to be within the scope of this invention.

The biofilter is created by first selecting an appropriate general pure strain of bacteria suitable for degradation of specific contaminants on the basis of their metabolic properties and emplaced within the aquifer. The typical procedure for selection of bacteria is to identify the contaminant as being a metabolic substrate for a selected bacterial strain. It has now been discovered that an otherwise pure strain of bacteria can be screened further, in a simple manner previously unrecognized, for even more suitable substrains possessing more pronounced metabolic characteristics in connection with any contaminant candidate to be subjected to in situ microbial filter bioremediation. Such bacteria are particularly screened for increased attachment properties combined with a decreased or slowed rate of detachment.

A desirable isolate can have these properties due to a variety of reasons. For example, for selection of *M. trichosporium* substrain OB3b for biodegradation of VOCs, the preliminary selection criterion was the ability to biodegrade the VOCs inherent in the parent strain, and the secondary criterion was the OB3b substrain's ability to form clusters of rosettes. Other attributes that enhance attachment, and hence are useful as substrain pre-screening criteria, include increased size, electrostatic charge or some other property that confers or increases cell surface stickiness to the bacteria.

The selected isolate, like the original strain, is then grown in a bioreactor until the biomass needed to form in situ biofilter is reached and that biomass is then injected into the subsurface.

The injection buffer in which the cells are suspended prior to injection to the aquifer is modified to further enhance the attachment and to slow detachment of the biofilter. For example, the additives enhancing the attachment and slowing of detachment of *M. trichosporium* OB3b were agar and ferrous and magnesium salts. Different additives might be appropriate for other bacteria or subsurface condition. Any bacterium that can attach to the subsurface soil or sediments of interest (e.g.s, sand, clay silicate, and carbonate based materials) and has the necessary metabolic properties to effect the type of contaminant bioremediation of concern is a potential candidate for this type of substrain-selection enhancement. The method is generally applicable to all contaminants which may be biodegraded by the bacterial cells.

C. A Laboratory Method for Prediction, Design and Optimization of Conditions for a Field Bioremediation In another aspect, the bioremediation method includes, is complemented and its effectivity is enhanced with a newly developed laboratory method for prediction, quantitation, design and optimization of conditions for field bioremediation.

The laboratory method involves determining pH, amount of dissolved oxygen, temperature and soil type and composition as well as a determination of identity of a contaminant and a degree of contamination of a contaminated site aquifer. Based on the above information, an appropriate bacterial strain possessing metabolic capabilities to cometabolize the contaminant is selected for an emplaced biofilter. Such selection consists of testing attachment properties of the individual isolates of the selected bacterial strain with or without addition of a variance of additives described elsewhere. After the optimal conditions, additives and amounts thereof for the growth and stability of the tested isolates are determined, the isolates are tested for their detachment properties and the best and most stable isolate is then selected, its longevity determined and if the half-life longevity is found to be about or longer then 8 weeks, the isolate is used for the emplaced biofilter.

The laboratory method also involves designing of an injection buffer composition and additives for optimization of conditions for the biofilter emplacement, its longevity and functionality. Typically, the attachment assay is followed with optimization of the additives, such as various salts, preferably magnesium or ferrous salts and agar, added to an injection medium. The optimization of the injection buffer or medium is followed with detachment assay. All isolates are tested and results of the attachment and detachment assays and additives optimization is analyzed and the most stable isolate is selected. Stability of the isolate depends on the length of the attachment which should be increased as much as possible and on the length of the detachment which should be decreased as much as possible. The most stable isolates are those which have the longest attachment time and the shortest detachment time.

After the selection of the best isolate, the isolate is tested for its half-life longevity by challenging the isolate cometabolic ability with various contaminants and different concentrations thereof. Preferably, the longevity should be about 15 weeks. Most preferably, the isolate's cometabolic activity is challenged with water from the site of a contaminated aquifer.

A critical factor in deciding whether bioremediation is possible for a contaminant at a specific site is whether the microorganism to be used is compatible with the specific conditions and/or characteristics, such as pH, dissolved oxygen, temperature, soil type, a type of contaminant, etc., of the contaminated site.

An overall laboratory pre-screening process able to determine and to validate the attachment and detachment properties of the biofilter was developed in the process of this invention.

Typically, after determining the contaminant of the aquifer and the conditions and characteristics of the contaminated site, selecting an appropriate bacterial strain or substrain possessing required metabolic activity as a biofilter bacteria and, if necessary, modifying the injection buffer for bacterial biofilter with additives, a series of attachment/detachment assays followed by metabolic assays using site specific sand or rock is carried out to determine the optimal injection conditions for remediation of that particular site.

The initial bacterial attachment rate determines the amount of biomass needed to create a filter of a given catalytic density and thickness, while the detachment rate contributes to the frequency of replenishment. These rates are determined by assay according to the Example 2. Knowing the above parameters, i.e. attachment and detachment rate allows the current method to be generalized in that a resting-cell microbial biofilter may be designed in such a way that its initially emplaced catalytic density, transformation capacity, and attached biomass provides a near complete (i.e. to <5 ppb) or a maximal extent of contaminant degradation.

Additionally, the method allows a safety net by allowing an overengineering. For example, the biofilter can be engineered in such a way that even if the biofilter's catalytic activity would decrease markedly (e.g. 90%), it would still meet its flow-through TCE-degradation design limit. This overengineering of the filter lessens a frequency of its replacement.

The invention, therefore, concerns a method for prediction, design and optimization of conditions for field bioremediation said method comprising steps:

(a) determining pH, dissolved oxygen, temperature and soil type of a contaminated site aquifer;

(b) determining an identity and degree of a contaminant;

(c) identifying a bacteria able to biodegrade said contaminant for an emplaced biofilter and testing its individual isolates for their stability and suitability as the emplaced biofilter;

(d) determining attachment/detachment properties of the tested isolate under the conditions of step (a);

(e) designing an injection buffer composition and additives for optimization of the biofilter emplacement, its longevity and functionality;

(f) confirming the designed conditions optimization with attachment/detachment assays followed with metabolic assays; and (g) selecting the isolate having the highest stability and attachment and lowest detachment properties.

Figure 3:
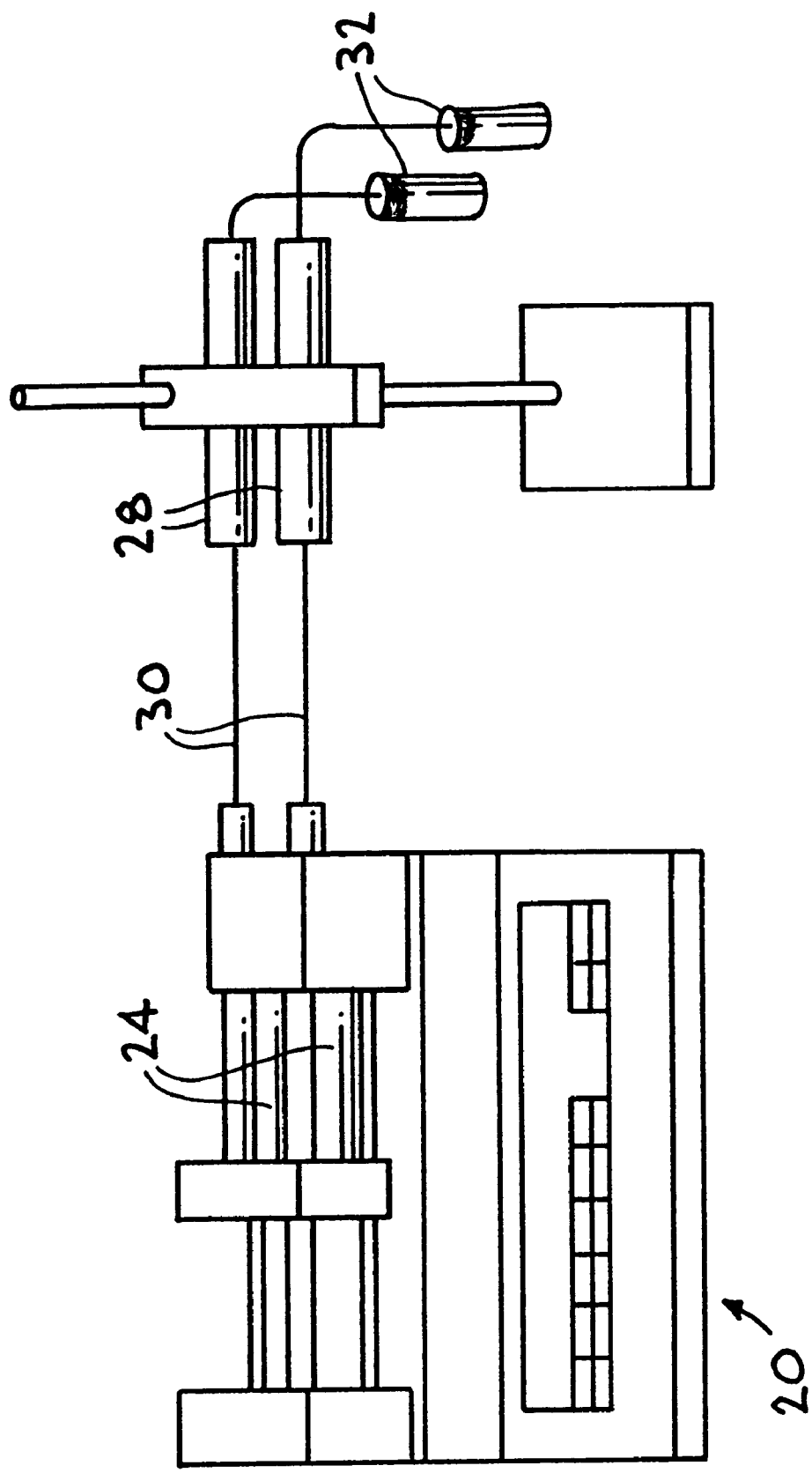
FIG. 3 is an illustration of the laboratory apparatus for the simulated attached-cell functional longevity testing and validation.

An illustration showing the apparatus and complete experimental set-up for conducting the field simulatory column-filter experiments appears in FIG. 3. The laboratory apparatus seen in FIG. 3 is suitable for the in that a resting-cell microbial biofilter may be designed in such a way that its initially emplaced catalytic density, transformation capacity, and attached biomass provides a near complete (i.e. to<5 ppb) or a maximal extent of contaminant degradation.

Additionally, the method allows a safety net by allowing an overengineering. For example, the biofilter can be engineered in such a way that even if the biofilter's catalytic activity would decrease markedly (e.g. 90%), it would still meet its flow-through TCE-degradation design limit. This overengineering of the filter lessens a frequency of its replacement.

The invention, therefore, concerns a method for prediction, design and optimization of conditions for field bioremediation said method comprising steps:

(a) determining pH, dissolved oxygen, temperature and soil type of a contaminated site aquifer;

(b) determining an identity and degree of a contaminant;

(c) identifying a bacteria able to biodegrade said contaminant for an emplaced biofilter and testing its individual isolates for their stability and suitability as the emplaced biofilter;

(d) determining attachment/detachment properties of the tested isolate under the conditions of step (a);

(e) designing an injection buffer composition and additives for optimization of the biofilter emplacement, its longevity and functionality;

(f) confirming the designed conditions optimization with attachment/detachment assays followed with metabolic assays; and (g) selecting the isolate having the highest stability and attachment and lowest detachment properties.

A photograph showing the apparatus and complete experimental set-up for conducting the field simulatory column-filter experiments appears in FIG. 3. The laboratory apparatus seen in FIG. 3 is suitable for the simulated attached-cell functional longevity testing and validation of the bioremediation method as well as for the optimization of conditions for the fields remediation. The laboratory apparatus includes the syringe pump (20), syringes for adding the TCE-phenol red (PR) pulses (24), the glass 1-cm×10-cm horizontal columns (28), the stainless-steel connectors (30), and the screw-capped 5-mL fraction collection vials (32).

D. A System for Biofilter Remediation

The invention also concerns a system for bioremediating contaminated water. The system for remediation typically consists of at least a surface bioreactor for growth of sufficient biomass of selected bacterial isolates, a mixing chamber wherein the isolate's cells or cell paste is suspended in water and additives are added, an injection apparatus for the biofilter formation in situ, a microbial biofilter emplaced in situ, a means for extraction of water through the biofilter. Additionally, the system typically contains a means for monitoring a purity of the remediated water and a means for controlling the temperature, pH, nutrients supply and oxygen or other gas needed for bacterial growth.

The system's injection apparatus is typically a pump which injects the cell suspension through existing injection or extraction wells into the aquifer to form an emplaced attached biofilter. The system's water extraction is typically achieved via an extraction pump placed in an extraction well. The purity of decontaminated water is determined using a monitoring well or laboratory equipment able to detect the contaminant.

The first component is a large surface bioreactor for growth of the selected bacteria until the sufficient biomass of bacteria to form an effective biofilter is obtained. The bioreactor typically has a means for controlling the temperature, pH, nutrients supply and oxygen or other gas needed for bacterial growth.

The second component of the system is a means for separation of the cell clusters culture from the growth medium. This component can be any suitable separator such as centrifuge. Once the bacteria are grown, they are separated from the growth medium, and the selected bacteria are transported to the site of the contamination.

The third component of the system is a mixing chamber where the cells or cell paste is suspended in water and transferred to a next component of the system, namely to the injection component for the biofilter formation in situ.

The fourth component of the system is an injection apparatus or preferably pump injecting the cell suspension using preferably the on site existing injection and/or extraction wells having configuration as seen in FIG. 2. There, the cell suspension is injected through the well into the aquifer to form an emplaced attached biofilter.

The fifth component of the system is the microbial biofilter emplaced in situ. The biofilter has preferably the density and thickness appropriate to the degree of contamination to assure the longevity of the functional biofilter for at least about 8 weeks.

The sixth component of the system is a means for extraction of water through the biofilter utilizing any suitable means, such as extraction pumps or extraction wells.

The final component of the system is a means for monitoring the remediated water, such as a monitoring well and laboratory equipment able to detect a degree of contamination.

E. *M. trichosporium* OB3b Biofilter

*M. trichosporium* OB3b contains a sufficient level of soluble methane monooxygenase (sMMO) to degrade cometabolically a number of chlorinated aliphatic hydrocarbons, including the highly toxic and regulated contaminant TCE. When cultured under the conditions of this invention, two distinct populations of *M. trichosporium* OB3b were found as shown in FIG. 4. One population consisted of single cells, the second population consisted of the rosette clusters. In one of the attributes of the invention, it was subsequently found that the *M. trichosporium* OB3b rosette isolate when subcultured successively for months does not loose its ability to grow in this rosette cluster form and is therefore suitable for large scale productions. The rosette clusters population of *M. trichosporium* OB3b was therefore a suitable candidate to test the method of the invention for the bioremediation of water contaminated with TCE.

For this purpose, *M. trichosporium* OB3b, a rosette-cluster forming isolate, was pregrown and then further screened by quantitative assays developed to assess its attachment, detachment, and functional metabolic longevity in a flow-through sand column.

Figure 4A:
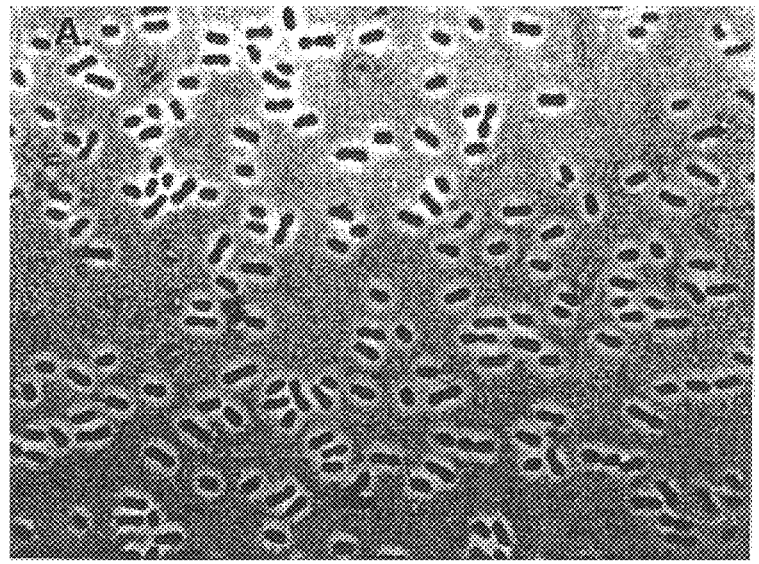
FIGS. 4A and 4B depict micrographs of a single-cell suspension (FIG. 4A) and a rosette suspension (FIG. 4B), both derived from the same otherwise pure strain culture of *M. trichosporium* OB3b.
Figure 4B:
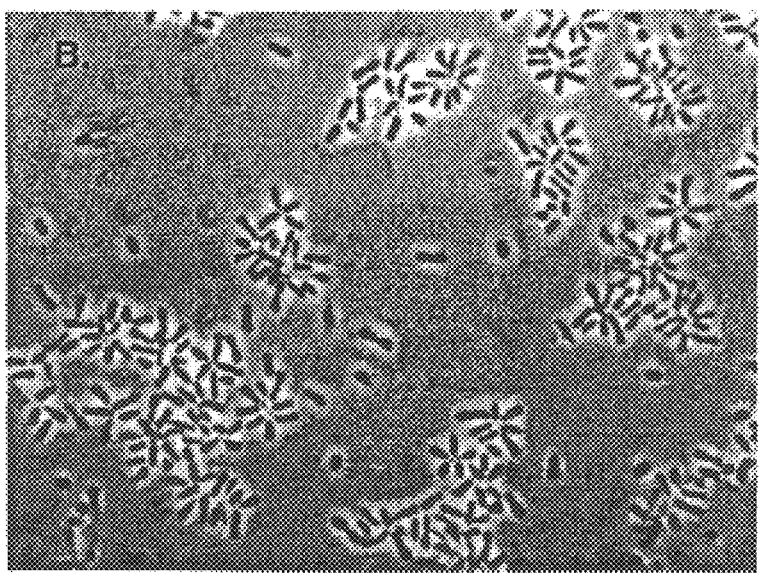
Figures 5A, 5B:
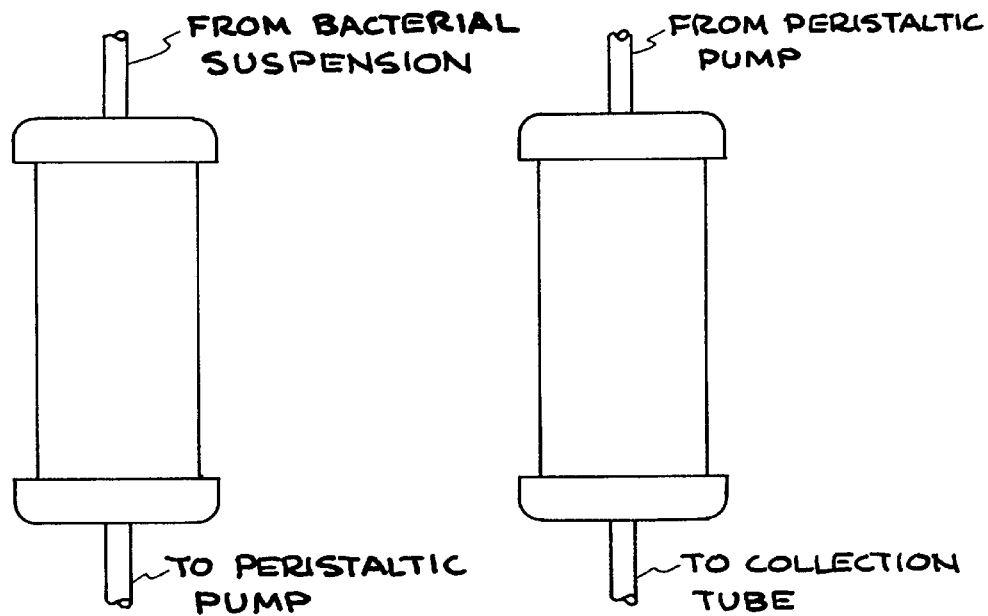
FIGS. 5A, 5B, and 5C are a schematic of bacterial attachment/detachment measurements by a sand-column pumping procedure.
Figure 5C:
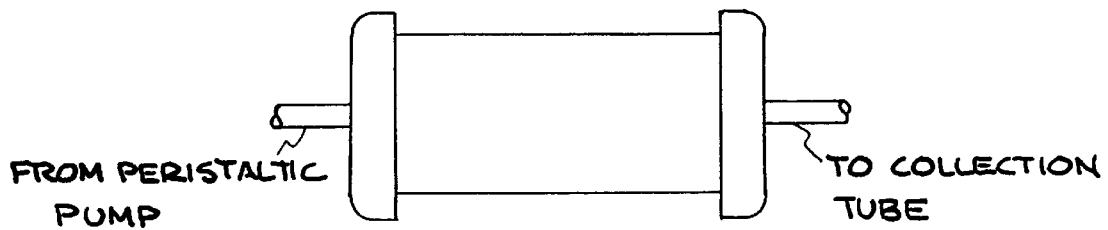
Figure 6B:
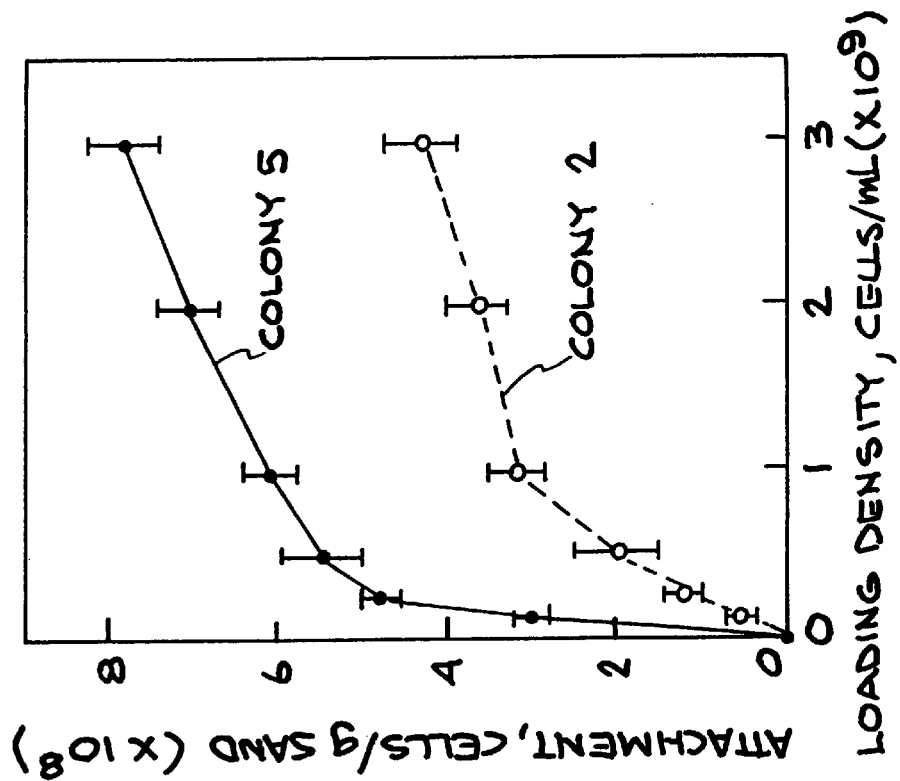
FIGS. 6A and 6B are graphs showing attachment of the *M. trichosporium* OB3b rosette (colony 5) and a single cell (colony 2) isolates as a function of the loading time (FIG. 6A) and cell density (FIG. 6B).
Figure 6A:
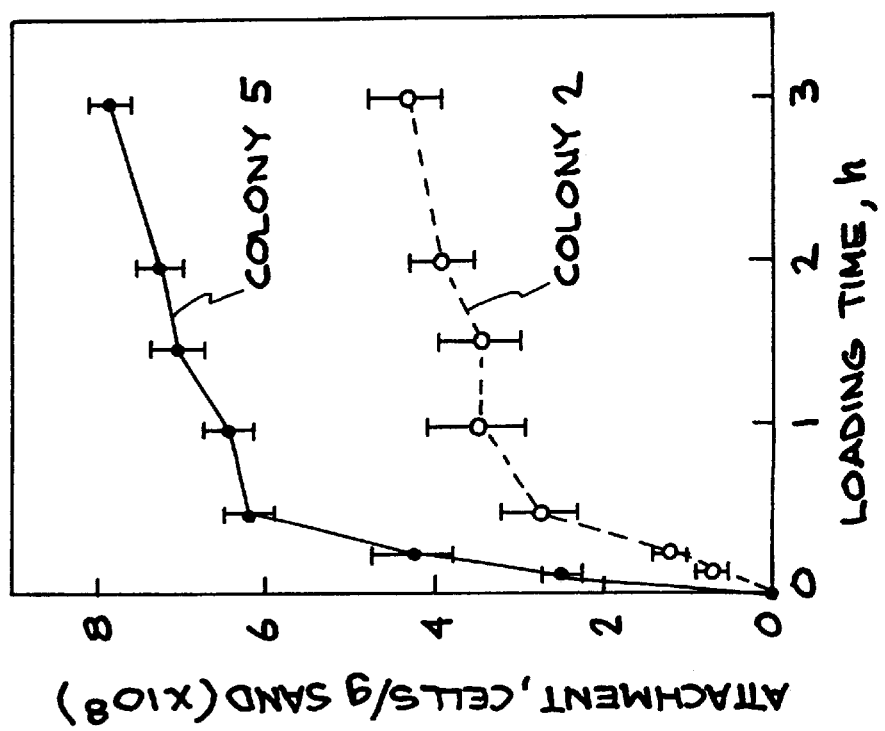

FIGS. 4A and 4B are phase-contrast micrographs showing two populations of *M. trichosporium* OB3b, derived from the same otherwise pure strain culture of *M. trichosporium* OB3b. *M. trichosporium* OB3b, as a single cell isolate suspension, is seen in FIG. 4A and the rosette-forming isolate is seen in FIG. 4B. Corresponding buffer suspensions of the parental strain culture are dominated by single non-clustered bacteria and microscopically appear to be the same as the cells in FIG. 4A. The cluster bacteria form seen in FIG. 4B clearly show a pattern of aggregation or clustering of the cells.

In both cases, the separately cultured, washed cells were suspended in 10 mM Higgins' phosphate buffer pH 7.0 (HPB). The microscopic magnification was 1,200-fold.

The single-cell and the rosette isolates were selected by picking individual colonies from agar spread plates. They were then maintained as separate stock subcultures apart from the original parental strain culture, based on their stable perpetuation of either a single-cell population (colony 2) (FIG. 4A) or a mostly rosette containing population (colony 5) (FIG. 4B) upon continued suspension culturing. The *M. trichosporium* OB3b rosettes are consistent with the rosette-like clusters typically seen in various type II methanotrophic cultures (*Appl. Environ. Microbiol.,* 59: 2380–2387 (1993).

A form of *M. trichosporium* OB3b (colony 5) that microscopically appears to exist predominantly in rosette clusters was further cultured and studies were conducted to ascertain differences between the rosette isolate and the single cell isolate of the original parental strain in the attachment to or detachment from saturated sand particles. Additionally, various chemical additives were tested to enhance the attachment density and to retard the detachment rate of the clusters from this sand. Specifically, pretreating the rosette-isolate with a combination of magnesium and iron salts and dilute agar was found to greatly enhance its attachment density to a saturated quartzitic sand. This was not observed for the single cell form that typifies the parental strain.

Subsequently, it has been demonstrated experimentally with a flow-through sand column that an attached resting cell methanotrophic biofilter, prepared with the rosette cells, operates extremely well for at least 2 months and to a lesser degree up to 4 months. Moreover, this biofilter continues to display significant chlorinated aliphatic VOC degradative activity even after 4 months.

To establish and maintain an in situ biofilter, it is crucial to maximize the cell attachment obtainable during the subsurface injection of the resting cells and to slow the detachment. The use of the rosette containing isolate of *M. trichosporium* OB3b, as compared to using the single cell form, markedly increased the attachment density.

Using the general protocol depicted in FIGS. 5A, 5B, and 5C, several parameters for the attachment of colony 5 and colony 2 to saturated sand were examined.

Specifically, for attachment phase measurements, columns (1 cm×10 cm) were prepared with Oklahoma No.1 sand in 10 mM Higgins phosphate HPB buffer having pH 7.0. Bacteria were pulled into columns at 0.33 mL/minute for 2 hours. The column was equipped with a peristaltic pump. Unattached bacteria were washed out at 0.11 mL/minute for 16 hours. Then, the sand and attached bacteria were extruded from the columns and the attached bacteria were enumerated. As depicted in FIG. 5C, after the 2 hour cell loading step, the column tubings and the position of the peristaltic pump are switched. Following the 16 hour 10 mM HPB cell washout step, the columns are rotated 90 degrees to a horizontal position, the flow rate is reduced, and fractions are collected during the subsequent detachment phase, also using HPB alone.

FIGS. 6A and 6*b* illustrate the attachment of *M. trichosporium* OB3b colony 5 and colony 2 to 1 cm×10 cm saturated sand columns as a function of the loading time and cell density. In FIG. 6A cells at $2\times10^9$/mL were loaded for the various times shown before the unattached bacteria were washed out for 16 hours, as outlined above. In FIG. 6B the cell density was varied, but at each concentration the bacteria were loaded for 2 hours. The attachment results plotted represent the average values±standard deviation for at least three independent determinations for each data point.

FIGS. 6A and 6B show that the attachment of *M. trichosporium* OB3b in HPB exhibited a saturation kinetics type of behavior with respect to both the loading time and the loading cell density, irrespective of which colony was used. Both cell types showed similar profiles. Yet, colony 5 reached a maximal attachment density of ~$8\times10^8$ cells/g dry sand, while colony 2 yielded only ~$4\times10^8$ cells/g dry sand under standard time-density attachment conditions (2 hours, $2\times10^9$ cells/mL loading density).

Effect of the loading-buffer mixture on the attachment of *M. trichosporium* OB3b is summarized in Table 1.

TABLE 1

Effects of the Loading-Buffer Mixture on the Attachment of *M. trichosporium* OB3b

| Bacterial suspension[b] loading-buffer mixture[a] | Attachment – cells/g sand × $10^8$ Colony 5 | Colony 2 |
|---|---|---|
| 10 mM HPB alone | 6.9 ± 0.2 | 4.2 ± 0.1 |
| 10 mM HPB + 1.0 mM $MgCl_2$ | 8.6 ± 1.2 | 3.2 ± 0.1 |
| 10 mM HPB + 100 $\mu$M $FeSO_4$ | 6.3 ± 0.8 | 3.8 ± 0.4 |
| 10 mM HPB + 0.075% agar[c] | 12.3 ± 1.8 | 4.3 ± 0.2 |
| 10 mM HPB + 0.25% agar[c] | 13.5 ± 1.4 | 5.6 ± 0.8 |
| 10 mM HPB + 1.0 mM $MgCl_2$ + 100 $\mu$M $FeSO_4$ + 0.0075% agar | 14.3 ± 0.8 | 5.1 ± 0.9 |
| 10 mM HPB + 1.0 mM $MgCl_2$ + 100 $\mu$M $FeSO_4$ + 0.025% agar | 14.3 ± 0.8 | 5.1 ± 0.9 |

[a]Bacteria were suspended in the indicated buffer mixture and loaded onto 1-cm × 10-cm columns
[b]The data listed represent the average values ± standard deviation for three independent determinations
[c]The agar included in the loading buffer was purified agar prepared on a dry weight/volume basis in HPB.

Table 1 shows the effects of the changes in the bacterial loading buffer mixture on the attachment of colony 5 and colony 2 under standard time-density conditions. The attachment of colony 2 was unaffected by the addition of magnesium or ferrous salts to the loading buffer, while the addition of 0.025% agar increased its attachment by 1.3-fold. Colony 5 attachment also was not influenced by $FeSO_4$, but was enhanced 1.25-fold by 1 mM $MgCl_2$, and 2.0-fold by 0.025% agar. These effects on the colony 5 cells were additive since Mg+Fe+0.025% agar improved its attachment by 2.3-fold to a maximal density of $15.6\times10^8$ bacteria/g dry sand.

Pasteur pipet attachment experiments in which such disposable mini-glass columns were scored with a file and then segmented, indicated that this increased colony 5 attachment was not due to entrainment on the tops of the columns (data not shown).

To maintain an in situ biofilter and to extend its longevity, it is also important to maximize the detachment retardation. This applies if in the biofilter creation it has been overengineered by initially emplacing a much higher density of attached cells than might be needed.

HPB detachment profiles for colony 5, previously loaded with the various buffer mixtures in Table 1, are plotted in FIG. 7A. HPB detachment profiles for colony 2 suspensions loaded with two of the buffer mixtures are shown in FIG. 7B.

Specifically, for detachment phase measurements, columns (1 cm×10 cm) were prepared with Oklahoma No.1 sand in 10 mM HPB buffer having pH 7.0. Bacteria were pulled into columns at 0.33 mL/minute for 2 hours as outlined in FIG. 5. After the 2 hour cell loading step, the column tubing and the position of the peristaltic pump were switched. Unattached bacteria were washed out at 0.11 mL/minute for 16 hours. The columns were then rotated 90° to a horizontal position, the HPB flow rate was reduced to 2.0 mL/h (6.25 cm/hour linear flow rate) and fractions were collected and bacteria were enumerated.

Figure 7A:
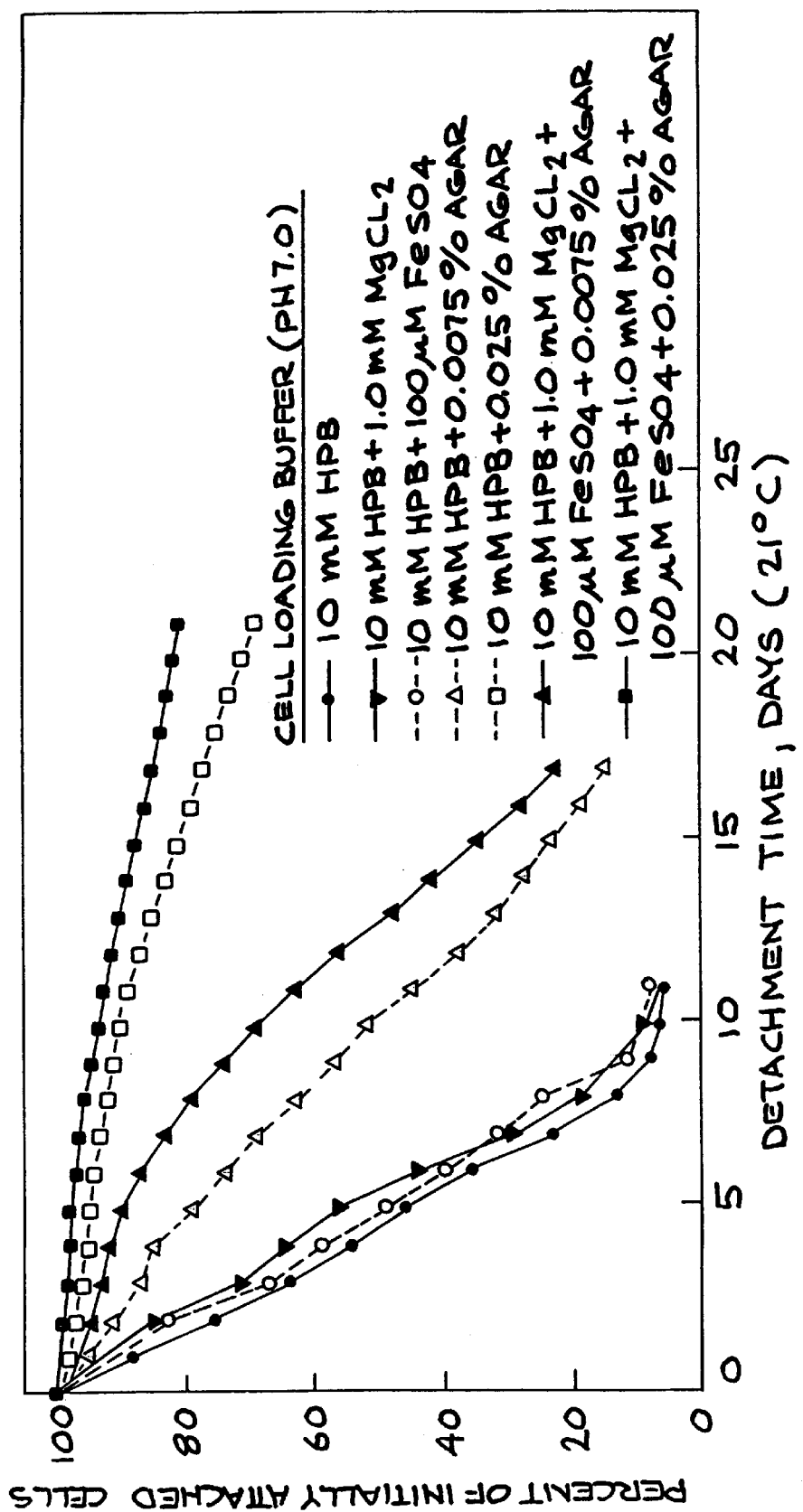
FIGS. 7A and 7B are graphs showing detachment profiles of the *M. trichosporium* OB3b rosette (colony 5) (FIG. 7A) and the single cell (colony 2) (FIG. 7B) isolates as a function of time following cell loading with different buffer mixtures.
Figure 7B:
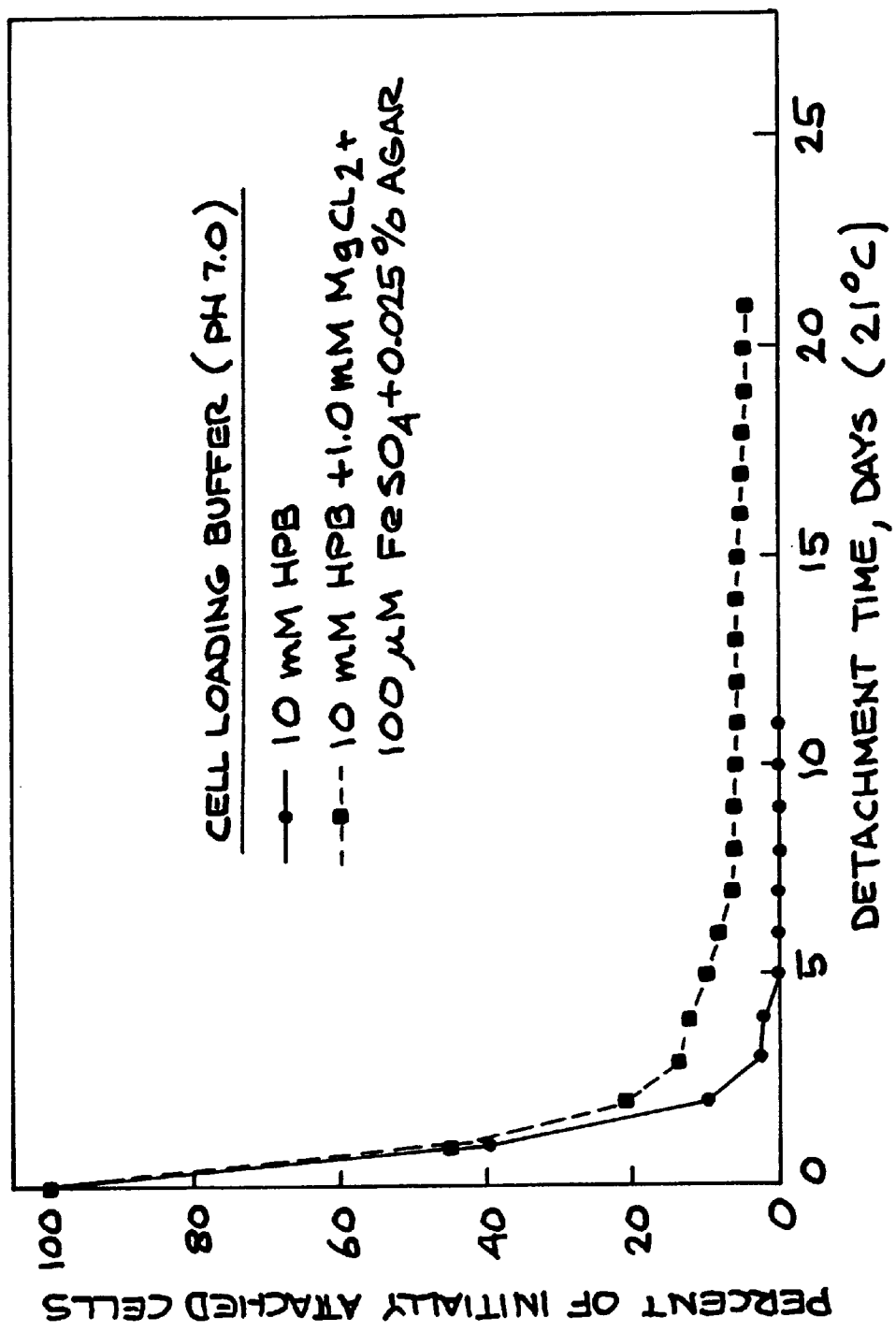
Figure 8A:
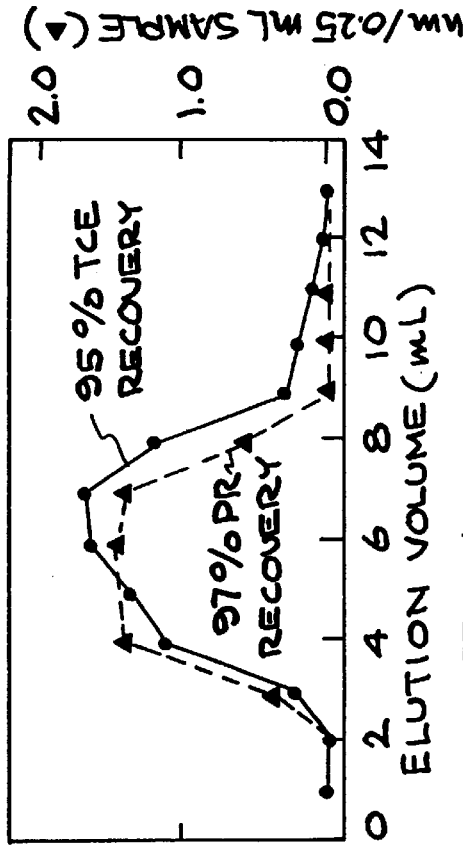
Figure 8B:
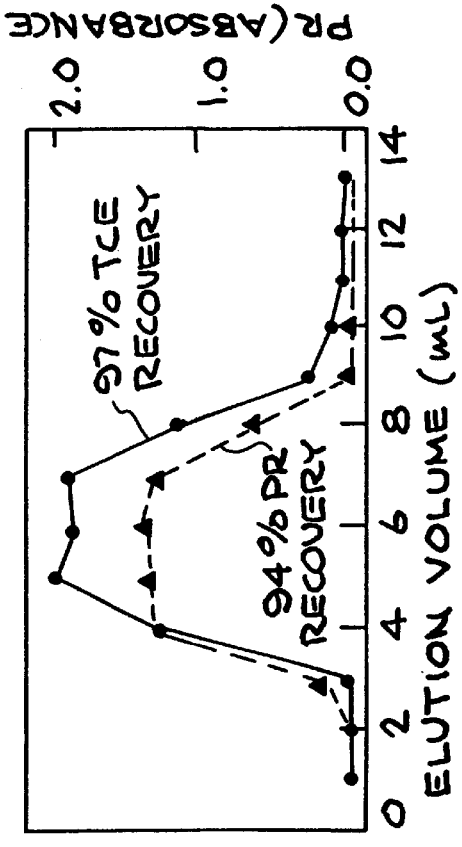
Figure 8C:
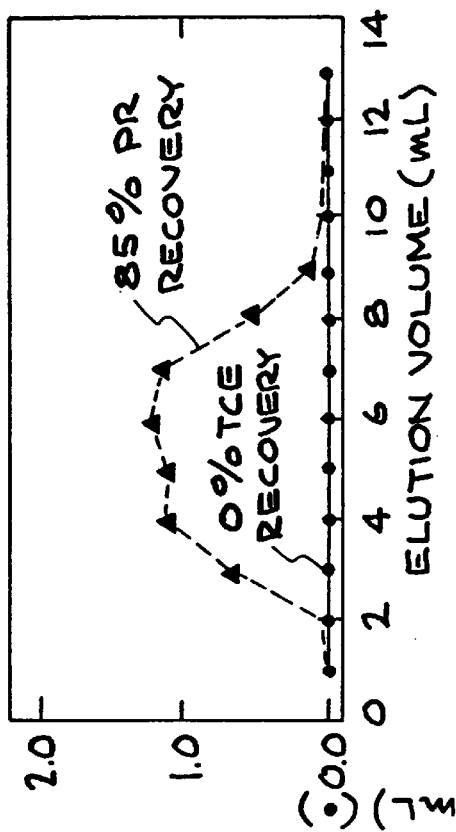
Figure 8D:
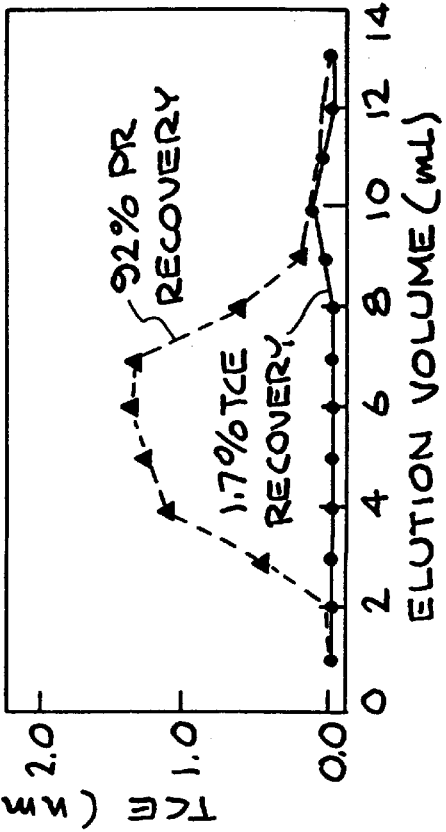

FIGS. 7A, 7B shows the detachment profiles of *M. trichosporium* OB3b colony 5 and colony 2, respectively, with 10 mM HPB alone, as a function of time following cell loading with several different buffer mixtures. For cell suspensions that had been loaded only in the presence of 10 mM HPB, the detachment half-lives were 5 days and ~1 day, for colony 5 and colony 2, respectively. The inclusion of 1 mM $MgCl_2$ or 100 $\mu M$ $FeSO_4$ in the loading buffer decreased the detachment rate of colony 5 only slightly. However, the addition of very dilute concentrations of agar to the loading buffer markedly slowed its detachment. The detachment half-life of colony 5 in the presence of 0.0075% of agar and 0.025% agar were increased to 10 and 32 days, respectively (FIG. 7A). The inclusion of 1 mM $MgCl_2$ and 100 $\mu M$ $FeSO_4$ with the HPB-buffered 0.0075% or 0.025% agar further retarded the colony 5 detachment, to half-lives of 13 and 45 days, respectively. The detachment half-life for colony 2 remained about the same in the presence of 1 mM $MgCl_2$+100 $\mu M$ $FeSO_4$+0.025% agar, namely ~1–1.5 days; although, a slow tailing by 5–10% of these cells was evident in its detachment profile (FIGS. 7A and 7B).

After the initial 2 hour load step, both the 16 hour wash out buffer and the detachment was HPB. Similar detachment profiles to those seen in FIG. 7A for colony 5 were obtained when carbonate-based groundwater from two different sites were substituted for HPB as the detachment solution (data not shown). Thus, the greatly enhanced detachment half-lives promoted by $MgCl_2$+$FeSO_4$+dilute agar are specific to colony 5 versus colony 2, but they are not confined to a single electrolyte such as phosphate.

Microscopic examination confirmed that during the 2 hour loading phase in the presence of 10 mM HPB-buffered $MgCl_2$+$FeSO_4$ and 0.0075% or 0.025% agar, colony 5 tended to aggregate into larger rosette clusters, while colony 2 remained as a single cell population. Aggregation of colony 5 did not occur, even after many hours in HPB alone. Agar at concentrations above 0.025% caused plugging of the sand columns by colony 5 and, therefore, would not in general be recommended. The advised range of dilute agar to incorporate into the cell loading (laboratory columns) or cell injection (field site) buffer mixture would be from about 0.0075% to about 0.025% on a dry weight/HPB volume basis.

Also critical to the enhanced attachment of the bacteria was the dilute agar included in the cell loading (injection) buffer. Since agar is a mixture of polysaccharides and may mimic the holdfast material, its effect on the loading buffer was tested. Dilute agar proved to be the major contributor to an increased attachment (Table 1) and the retarded detachment (FIG. 7A), perhaps due to its ability to cause the rosettes of colony 5 to aggregate into somewhat larger groups. Alternately, the agar in the cell loading mixture may also aid attachment by neutralizing the sand surface silicates in combination with the $Fe^{+2}$ and $Mg^{+2}$ cations. Irrespective, since colony 2 does not aggregate in the same manner, there seems to be an intrinsic difference in the chemical constitution of the surfaces of these two isolates.

When selecting additives to be included with the loading buffer, it is important to take advantage of any peculiarities of the particular bacterial system chosen. In the case of the *M. trichosporium* OB3b rosette isolate, agar (a mixture of polysaccharides) was chosen to mimic the polysaccharide-containing material that holds the rosettes together.

In designing the conditions and selection of additives, it is important to take into account any special characteristics of the additives so that the additives do not have any adverse effects on the whole-cell degradative activity of the bacteria. This should be verified before using them in the attachment/detachment assays. Magnesium and ferrous salts together with dilute agar, individually and all together, have no effect on the sMMO activity of *M. trichosporium* OB3b.

F. Attached Cell-Column Longevity and Field Studies

Ultimately, the importance of this invention rests in the fact that the longevity of the microbial filter is extended to practical and economical time-periods. Therefore, further laboratory studies were performed to validate that the improved attachment/detachment properties of the rosette isolate, in combination with additives, actually result in the enhanced longevity of the microbial filter.

Because of its greatly elevated attachment and markedly lowered detachment, when loaded in the presence of HPB buffer 1 mM $MgCl_2$+100 $\mu M$ $FeSO_4$+0.025% agar, colony 5 and the above loading mixture were chosen for an attached cell longevity experiment. Biodegradation profile data for the 12 hour TCE-PR pulses that were delivered at time zero (i.e., immediately after the 16 hour unattached cell washout step) and at five weekly time-points during the 15 week experiment are depicted in FIGS. 8A, 8B, 8C, 8D, 8E, 8F, 8G, 8H, 8I, 8J, 8K, and 8L. During the TCE pulse times and the intervening periods the pump rate was consistently maintained at 0.4 mL/hour (1.25 cm/hour linear flow rate).

Over a 15-week period (almost 4 months) the average total amount of each TCE-PR pulse was 9.2 nmoles (range 8.4–9.8 nmoles) and the column flow-through residence time was ~8 hours. The test and control columns were run simultaneously and recovery of TCE from the control column was always at least 95%. For 8 weeks, the attached cell column filter almost completely degraded each 1250 ppb pulse of TCE (FIG. 8).

Figure 9A:
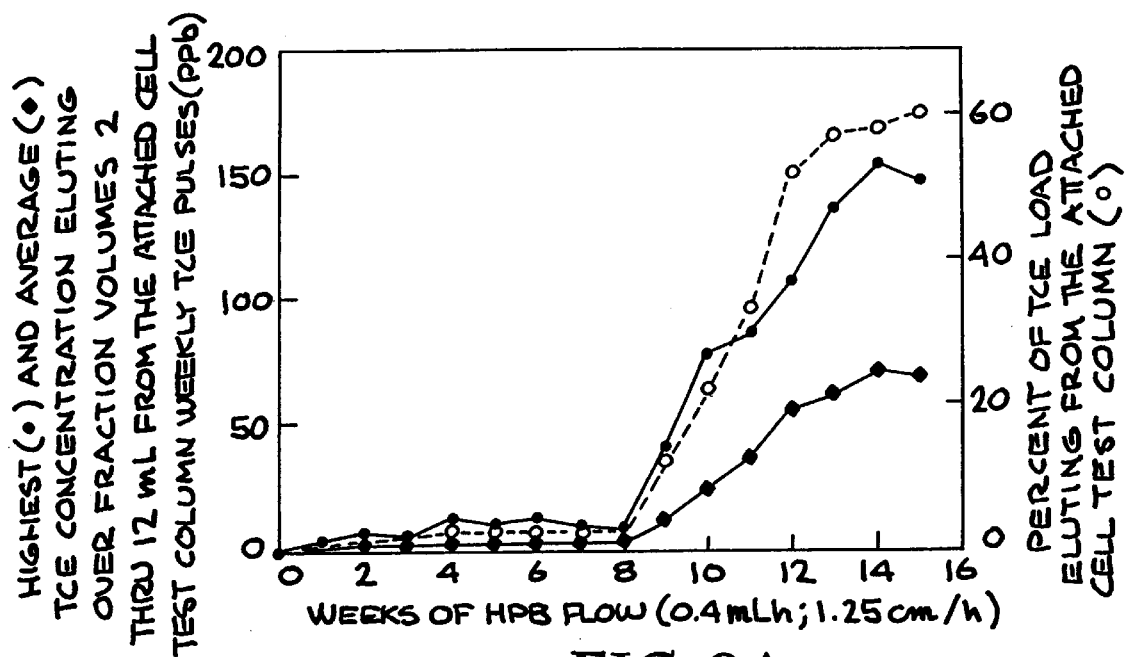
FIGS. 9A and 9B are plots of the weekly profiles of the non-metabolized TCE (A) and the bacterial detachment (B) for the attached Cell Test Column in FIGS. 8A through 8L, inclusive.

Weekly profiles of the non-metabolized TCE (A) and the bacterial detachment (B) for the attached cell test column during the functional longevity experiment in FIGS. 8A through 8L, inclusive, are plotted in FIG. 9. It is noteworthy that, as seen in FIG. 9A, even after 15 weeks, about 40% of the last TCE pulse was biodegraded.

FIG. 9A shows both the highest and average concentrations of non-metabolized TCE eluting from the attached cell test column during each of the ~250 ppb TCE pulses over the course of the 15-week experiment. Elution of very small amounts (maximal ~10 ppb or less) of non-metabolized TCE from the attached cell test column during the first 8 weeks appeared to be slightly delayed, elution volumes 9–11 mL versus the typical elution peak position of 5–8 mL for TCE from the minus cell control column (FIG. 8). In this experimental set-up, this may be due to microscopic amounts of drying along the upper edge of the horizontal column, which might have allowed the TCE to be retained longer in tiny gas bubbles along this edge of the column. Any TCE in such bubbles would be less bioavailable to the attached bacteria than the bulk of the dissolved TCE pulse which passed through the aqueous pore spaces of the saturated sand. Irrespective, for the first 8 weeks, this resting cell filter functioned extremely well, lowering the emerging average TCE levels to<5 ppb. The federal and state mandated regulatory level for the complete remediation of TCE is 5 ppb. After 8 weeks the amount of non-metabolized TCE began to increase slowly in a nearly linear fashion up to 15 weeks.

Figure 9B:
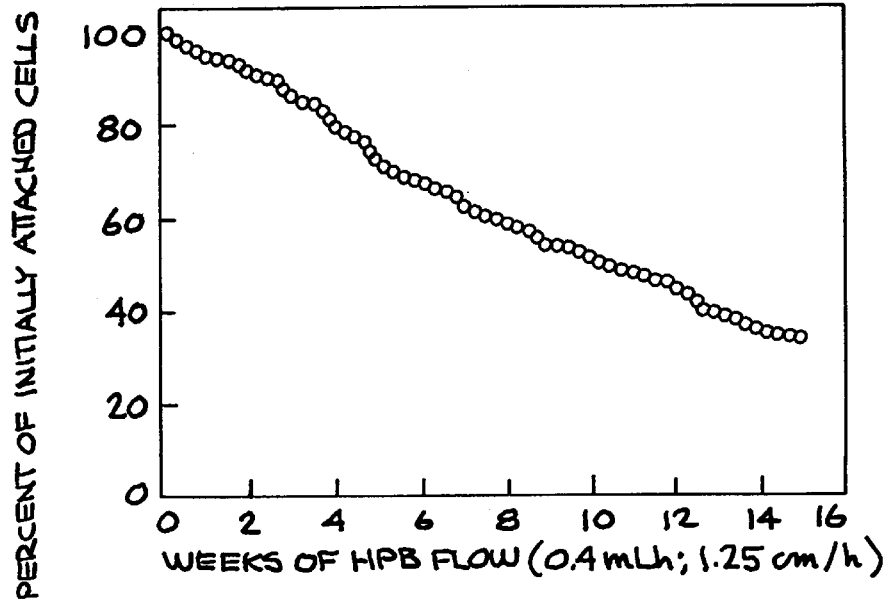

Over the course of the column longevity experiment small fractions of the originally emplaced bacteria were continuously detaching during the constant 10 mM HPB flow (FIG. 9B). After 15 weeks, extrusion of the sand and counts of the remaining cells indicated that only 34% of the initially attached colony 5 cells were still on the column. The detachment half-life was ~70 days (linear flow rate 1.25 cm/hour) in FIG. 9B in comparison to the 45-day half-life when the HPB flow rate was 5 times faster (FIG. 9A) for colony 5 cells loaded in the presence of 1 mM $MgCl_2$+100 $\mu$M $FeSO_4$+0.025% agar. A slower linear HPB flow of 1.25 cm/hour was utilized in the column longevity experiment (FIG. 8) to mimic typical TCE-contaminated aquifer flows beneath the field contaminated sites and to provide at least an 8 hour residence time within the attached cell filter.

Microscopic examination of cell population revealed that after the sand column extrusion most of the remaining attached cells were *M. trichosporium* OB3b and that rosettes were still present, but at a reduced level of ~20% of the population (data not shown). The whole-cell [1,2-$^{14}$C]TCE degrading specific activity, had dropped from 52.3 nmol/min/mg of dry cell wt to 4.3 nmol/min/mg (with formate) and from 30.5 nmol/min/mg dry cell wt to 0.5 nmol/min/mg dry cell wt (minus formate). Interestingly, however, at 15 weeks with only 34% of the initially emplaced bacteria still attached and with the cells remaining displaying 2% of their initial minus-formate whole-cell activity, it was remarkable that the column filter still metabolized 40% of the ~250 ppb TCE pulse at this time point (FIG. 9A).

The addition of $MgCl_2$, $FeSO_4$, and dilute agar to the loading buffer allowed not only to produce initially a filter with a much larger population of attached cells (~1.5×10$^9$/g sand), but also to retain 34% of the cells on the filter by the end of the column longevity experiment after 15 weeks (FIG. 9B). A calculation based on the number of cells extruded, gives an estimated 6.2×10$^9$ total bacteria, or 5.0×10$^8$/g of dry sand, remaining on the column at the end of the experiment. Clearly the initial attachment density was great enough and the detachment sufficiently slow, that attachment/detachment processes under these conditions (column linear flow rate of 1.25 cm/h) were no longer the critical factors controlling the functional longevity of the simulated filter.

The longevity studies, the results of which are seen in FIGS. 8A through 8L, inclusive, and 9A and 9B, were designed so that the biotransformation capacity of the bacteria for TCE would not be a limiting parameter. The sum total amount of TCE in the 15 pulses of the longevity experiment (FIGS. 8A through 8L, inclusive, and 9A and 9B) was restricted to only 138 nmoles or 18 $\mu$g. The biomass initially attached to the 1-cm×10-cm sand column was ~18.2×10$^9$ cells or ~10 mg of dry cell wt. Thus, this amount of bacteria/mass initially could have biodegraded ~2.5 mg of TCE. Moveover, using ~6 mg as the average attached biomass over the course of the experiment illustrated in FIG. 7B and allowing a ~50-fold loss in the biotransformation capacity, based on the formate rate data after 15 weeks, 6 mg of such cells theoretically still could have degraded a total of ~300 $\mu$g of TCE, i.e., if given a much longer contact or residence time within the filter by greatly slowing the TCE-pulse flow rate through the attached cell test column.

The column longevity experiment (FIG. 8) was designed to be an extension of previous 1.1-m flow-through experiments in a two-dimensional test bed that demonstrated the short term effectiveness of the microbial filter approach to degrade ~100 ppb pulses of TCE. This was an HPB-saturated Oklahoma No.1 sand system in which a 10-cm thick *M. trichosporium* OB3b filter was established. The 1-cm×10-cm glass columns were utilized to represent cylindrical segments of that 10-cm thick test bed filter. By using flow rates that are common to chlorinated VOC contaminated sites, the functional longevity of an attached resting-cell population under conditions similar to those expected for a sand-filled trench in the field can be reasonably estimated and it can be determined whether attachment/detachment or whole-cell sMMO stability is the most likely limiting factor for the long term operation of such a filter.

For the above reasons, the sand columns in FIG. 8 purposely were not fed TCE continuously as would be the case for an emplaced microbial filter in the field. Thus over the 8 weeks in which the ~250 ppb pulses (12 hours, 0.4 mL/h) of TCE were almost completely degraded by the attached cell column, only ~15 pore volumes of contaminated water actually were treated. In a continuous contaminant input mode, however, at the flow rate employed ~168 total pore volumes of TCE would have been treated. This translates to a significant length of contaminated flowing groundwater, namely ~17 meters over ~2 months. For a more rigorous simulation of the microbial filter concept and field implementation diagramed in FIGS. 1 and 2, the apparatus in the illustration (FIG. 3) can readily be adapted to run functional longevity tests in a continuous TCE (or other contaminant) mode. The continuous time can be varied from a few days to weeks. This was demonstrated using the parental strain of *M. trichosporium* OB3b and employing site specific sediment and groundwater. 50-mL syringes were used as the reservoir for contaminated groundwater and biodegradation was followed over a 72 hour time period (Third International In Situ and On-Site Bioreclamation Symposium Book Series: *Bioaugmentation for Site Remediation*, 3: 15–29, 1995).

Analyses of the freshly grown bacteria at the start of the longevity experiment and again after their extrusion from the sand column indicate that most of the initial TCE degradation activity disappeared by 15 weeks. The absolute degradation rate of TCE by the attached bacteria on the column would be very much slower because 250 ppb is far below the apparent whole-cell Michaelis constant, 13.6 ppm, that was obtained earlier for fresh bioreactor cultivated *M. trichosporium* OB3b cells.

A field test of the parental strain of *M. trichosporium* OB3b showed that filter could be formed in the subsurface. During the first 50 hours of the extraction phase, the filter performed very well. It removed 98% of the 425 ppb TCE. After that time, the filter degraded rapidly over the course of the 40-day field test (*Environ. Sci. Technol.*, 30, 1982–1989, (1996). The decline in degradation was caused in part by reduced bacterial attachment with tie. This demonstrates the importance of attachment/detachment parameters to overall field site success and the need for this invention.

The functional longevity of a column biofilter, formed with resting-state rosette cells in the presence of the above additives, was determined by challenging it with weekly 12-hour, ~250 ppb pulses of TCE. These sand-attached cells degraded the TCE pulses to<5 ppb for 8 weeks. Some TCE breakthrough was apparent at the ninth week. After 15 weeks, the remaining attached bacteria were still able to degrade 40% of the TCE pulse even though, when removed from the column, they retained<10% of their original rate of TCE-degrading activity.

Column results indicate that the operational longevity of the proposed sand-trench microbial filter for low TCE concentrations depends chiefly on the endogenous stability of the whole-cell soluble methane monooxygenase system and that such a filter will need replenishment at approximately 8–15 week intervals.

UTILITY

A variety of subsurface aquifer contaminants are treatable via bioremediation using a microbial filter approach.

Five different types of contaminants currently are known to be readily susceptible to bacterial biodegradation or biotransformation. Petroleum and coal-derived hydrocarbons and their derivatives, halogenated aliphatics including trichloroethene (TCE), halogenated aromatic and nitroaromatics, may be transformed by either aerobic or anaerobic bacterial processes according to this invention. A critical factor in deciding whether bioremediation is possible for a contaminant at a specific site, is whether the microorganism to be used is compatible with the specific conditions and/or characteristics, such as pH, dissolved oxygen, soil type, etc. of the site.

This invention represents the first time that anyone has shown that a rosette-forming methanotroph can be selected, cultured, its attachment/detachment properties changed, and its longevity increased. As a result the methanotroph can, in this way, be utilized advantageously for specific remediation applications.

EXAMPLE 1

Culture Conditions

This example describes conditions used for culturing *M. trichosporium* OB3b single cells or rosette clusters populations.

*M. trichosporium* OB3b was obtained from Professor R. S. Hanson (Gray Freshwater Biological Institute, University of Minnesota).

*M. trichosporium* OB3b was routinely maintained by suspension culturing at 30° C. on Higgins' nitrate minimal salts medium lacking Cu (NMS) according to *Biotechnol. Bioeng.*, 38: 423–433 (1991) under a methane/air gas mixture (1:1, v/v). After several months of continuous shake-flask cultivation, cells from single well separated colonies were isolated by dilution-spreading on 1.7% agar plates containing NMS. The plates had been incubated for 14–21 days at 30° C. in a gas-tight jar under a 1:1 (v/v) methane/air gas mixture. These isolates were classified microscopically based on the presence of mainly single-cell or rosette (*J. Gen. Microbiol.*, 61: 205–218 (1970)) containing populations. Of ten colonies examined, an isolate with only single-cells and another isolate with the largest percentage of rosette clusters were selected for further study. The two selected isolates maintained their single-cell or rosette character upon repeated suspension subcultured in shake-flasks or in a 5-L bioreactor (Bioflo III), commercially available, New Brunswick Scientific, NJ on Higgins nitrate minimal salts medium lacking copper modified as reported previously in *Hydro Sci. J.* (*IAHS*), 38: 323–342 (1993). The Modified Higgins' Salts (MHS) medium lacking Cu initially contained 2×nitrate, 2×FeSO$_4$-7H$_2$O, and 40×Na$_2$MoO$_4$-2H$_2$O versus the NMS, and NiCl$_2$ was added at 7.5 $\mu$M. The bacteria were harvested after 88–105 hours by centrifugation at 12,000×g, washed two times with 10 mM Higgins' medium phosphate buffer, pH 7.0 (HPB), and then resuspended in the same buffer and adjusted to 2×10$^9$ cells/mL using an electronic particle counter mode ZB1 commercially available from Coulter Electronics, Inc., FL, equipped with a 30 $\mu$m aperture. Twice filtered 4% NaCl was used as the counting solution according to *Water Resour. Res.*, 30: 25–35 (1994).

EXAMPLE 2

Column Cell Attachment/Detachment Assays

This example describes column assays used for determination of cell attachment and cell detachment.

Cell attachment assays were carried out by a modification of the disposable Pasteur-pipet column described in *Water Resour. Res.*, supra. In a modified assay, sand columns were prepared in 1-cm (I.D.)×10-cm glass tubes (C-10 columns), commercially available from Pharmacia Biotech Inc., NJ. These columns contained ~12 g of Oklahoma No. 1 sand obtained from T&S Materials, Gainesville, Tex., an ortho-quartzitic silicate with 84% of the grains having a diameter between 0.1 mm and 0.25 mm, a bulk permeability of ~8.5 darcys, and a porosity of 0.32±0.02 in HPB. A 5-mL pipet was used to add the sand, as a slurry in 10 mM HPB. The sand was allowed to settle through a layer of HPB within the C-10 tubes and continuous additions were made until the columns were completely filled. They were then washed with HPB for 3 hours at 2 mL/min.

In the cell loading step, bacteria (2×10$^9$ mL) were pulled onto the saturated sand columns at 0.33 mL/min (63 cm/h column linear flow rate) for 2 hours with a peristaltic pump (8 channel, Minipulse III) obtained from Gilson Medical Electronics, Inc., at 210 C. The loading step was followed by a washout step, in which the unattached bacteria were removed at 0.11 mL/min (21 cm/hour column linear flow rate) for 16 hours. Column linear flow rates were determined experimentally from the breakthrough times, i.e. the midpoints of the ascending limb profiles, given by short pulses of dilute phenol red (PR). Phenol red is a common colored pH indicator that can be quantified spectrophotometrically and was previously validated to be a useful non-binding, inert tracer for aqueous flows through saturated sand. *Water Resour. Res.*, 30: 25–35 (1994). For the initial attachment measurements, the sand and attached bacteria in the columns were then extruded into 25 mL graduated cylinders and the volume was brought to 25 mL with distilled water. Cells were separated from the sand by shaking for 10 seconds and allowing the sand to settle for ~1 min. The bacteria were then enumerated with a Coulter counter.

For the detachment experiments, the connector tubing and the position of the peristaltic pump were switched after the 2-hour cell-loading step, so that the buffer could be pumped onto the tops of the columns and fractions collected from the 5 bottoms. Following the 16-hour washout step, the columns were rotated 90° C. to a horizontal position and the 10 mM HPB flow rate was reduced to 0.033 mL/min (6.3 cm/hour column linear flow rate). This flow rate was selected to match the fastest known linear-flow rates for subsurface groundwater tested. Fractions were collected every 24 hours and the detached bacteria were monitored with a Coulter counter.

EXAMPLE 3

Functional Longevity Study

This example describes studies performed for determination of microbial functional longevity.

Bacteria were suspended in 10 mM HPB containing 1 mM MgCl$_2$+100 $\mu$M FeSO$_4$+0.025% agar obtained from Purified Agar, Oxoid Limited, (Basingstoke, Hampshire, England), at 2×10$^9$ cells/mL and loaded onto a 1-cm×10-cm column for 2 hours at 0.33 mL/min (Attached Cell Test Column). As a control, a similar column was loaded with the same buffer mixture lacking bacteria (Minus Cell Control Column). After the standard 16-hour washout phase, the columns were turned horizontally and attached to a syringe pump (pump 22) obtained from Harvard Apparatus. Ten mL gas-tight Hamilton syringes were filled with 10 mM HPB containing 110 $\mu$M PR and ~2 $\mu$M (~250 ppb) trichloroethylene (TCE). Phenol red (PR) was included as an internal visual pH indicator and quantifiable conservative tracer for the TCE pulse. Pulses were delivered via the pump for 12 hours at 0.4 mL/hour (column linear flow rate of 1.25 cm/hour). Fractions (1.0 mL) were collected every 2.5 hours using 90°-bent stainless steel cannulas inserted into 5 mL vials sealed with open-top-closure screw caps and PTFE-faced red rubber septa. The PTFE findings were placed downward towards the gas phase and exactly 1 mL of air was removed from the vials prior to collecting each sand-column fraction to prevent a subsequent 20% pressure rise when the 1.0 mL liquid fractions entered these sealed 5 mL vials. Tribasic sodium phosphate, 15 $\mu$moles in 50 $\mu$L, also was added to the 5 mL vials prior to collecting the fractions in order to eliminate any residual TCE metabolism due to cell spillage from the sand column into the collection vials. After 12 hours, the syringes were replaced with identical syringes containing 10 mM HPB alone, and fractions were collected for an additional 20.5 hours at the same flow-through rate. After 32.5 hours the syringe pump was replaced with a peristaltic pump and a flow of 10 mM HPB was continued at 0.4 mL/hour for 5.65 days, i.e., until the start of the next TCE pulse. The columns were rotated 180° along their horizontal axes every day to minimize any drying along their top edges. A concern about regularly eliminating any possible minute dry spots was driven by the fact that a few tiny bubbles periodically formed in the columns, even under the most careful handling conditions, when the input 10 mL syringes were switched. Each week the columns were challenged with an additional TCE-PR pulse in the same manner.

Over the 5.65 day intervals between each successive TCE-PR pulse, fractions (10 mL each) were collected every 24 hours from the test and the minus cell control columns. The detached cells in these fractions and those in the 1.0 mL fractions collected during the TCE-PR pulses also were enumerated with a Coulter electronic particle counter. Bacterial spillage from the Test Column was determined by subtracting the Control Column particle counts from the Test Column counts. This presented no problem in accurately assessing cell detachment overtime from the Test Column versus the Control Column because over the 15 week experimental period the former were in the range of $2.3 \times 10^7$ to $1.4 \times 10^7$ while the later were much lower and nearly constant ($1.6 \times 10^6$ to $0.7 \times 10^6$). After 15 weeks the columns were extruded, the cells were counted, and a total initial cell load was calculated.

EXAMPLE 4

Analytical Methods

This example describes analytical methods used for the development and testing of this invention.

TCE was quantified by manually injecting 400 $\mu$L gas phase samples from the 5 mL vials into a gas chromatograph (Hewlett Packard model HP5890) equipped with a flame-ionization detector and a 6-ft stainless-steel packed column (0.1% AT-1000 on Graphac-GC obtained from Alltech. Duplicate head-space samples were always analyzed for each vial. The column temperature was 135° C. and nitrogen was used as the carrier gas at a flow rate of 40 mL/min. The vial headspace TCE GC peak areas were directly compared to those generated with 5 mL vials to which 0.05 to 1.0 nmole of TCE was added to vials also containing 1.0 mL of 10 mM HPB at 21° C., followed by equilibration and head-space sampling in an identical manner. The GC detection limit for TCE (total in the vial) was<0.04 nmoles, when 400 $\mu$L head-space samples were withdrawn from the vials and analyzed. The GC area precisions for the TCE in the sand-column fractions and the standards were consistently±2% and the frequently checked gas-phase/aqueous-phase partitioning at 21° C. for ~250 ppb TCE within the 5 mL vials was 0.79.

Phenol red (PR) in the sand-column fractions was measured by diluting 0.25 mL aqueous samples to 1.0 mL with 13.3 mM NAOH and then reading the pH 12 absorbance at 558 nm in a Model 260 spectrophotometer commercially obtained from Gilford Instrument Lab., Inc.

EXAMPLE 5

Detection of Whole-Cell sMMO Activity with TCE

This example describes detection of the cell sMMO activity with TCE.

At the time of harvest and again after the sand-column extrusion at 15 weeks, the bacteria were assayed at 30° C. for their whole-cell specific rate of TCE degradation using a [1, 2-$^{14}$C] TCE (2,000 cpm/nmol) radiotracer assay, plus and minus 20 mM formate as a source of sMMO reducing power. (*Hydro. Sci. J.*, 38: 323–342, (1993); Third International In Situ and On-Site Bioreclamation Symposium Book Series: Bioaugmentation for Site Remediation, 3: 15–29, (1995)). The initial steady-state rate of biotransformation of TCE was 52.3 nmol/min/mg in the presence of formate and 30.5 nmol/min/mg in its absence. (1,2-$^{14}$C] TCE 6,2 $\mu$Ci/$\mu$mol) dissolved in water (or 0.1 mM HCl) was purchased from the Sigma Chemical Co. Previously, it was determined that this product, which is marketed as being ~98% radiopure, typically contains ~10% (range 4–20%) of storage-radiolytic contaminants. They are water-soluble, non-volatile (stable to lyophilization) and consist of [$^{14}$C] bicarbonate, [$^{14}$C] formate, and other components that do not appear in a typical gas chromatographic profile for TCE. Recently *Environ. Sci. Technol.*, 29: 1210–1214 (1995) reported that [1,2-$^{14}$C] TCE, purchased from Sigma, volatilizes less rapidly than unlabeled TCE and suggested caution in its use, due to possible contaminants. This contaminant problem was readily eliminated by first adjusting the Sigma [1,2-$^{14}$C] TCE with cold TCE to a concentration of 5 mM at the desired specific radioactivity and then carrying out a microdistillation. Aliquots (1.0 mL) of the above 5 mM [1,2-$^{14}$C] TCE were distilled at 35–40° C. for 90 minutes from a glass sealed 5.0 mL vial, through a small glass connector (Wheaton Claisen adapter) into a sealed 1.0 mL glass collection vial bathed in liquid nitrogen performed in dim light because TCE vapors are somewhat light sensitive. The trapped [1,2-$^{14}$C] TCE was then reconstituted by injecting 0.1 mM HCl into the frozen collection vial and subsequently thawing its contents slowly. Overall recoveries of actual (1,2-$^{14}$C] TCE were 70–80%.

The amount of dry cell weight was determined routinely from the absorbance of the bacteria at 660 nm in the Gilford spectrophotometer. For both the single-cell and the rosette containing isolates of *M. trichosporium* OB3b, one unit of absorbance corresponded to 0.27 mg of dry cell wt/mL.

EXAMPLE 6

Bioremediation of Sites Contaminated with Chlorinated Hydrocarbons

This example describes a method used in field bioremediation of the invention. The system for field testing the invention is illustrated in FIGS. 1 and 2.

Bacteria were grown on a large scale in surface bioreactors, harvested, and taken to the site as a paste. They were resuspended in Higgin's phosphate buffer alone. They were then injected into the subsurface using several different configurations, as depicted in FIG. 2.

A Huff-And-Puff field test (*Environ. Sci. Technol.*, 30: 1982–1989 (1996)) was conducted with the parental and rosette cluster strain of *M. trichosporium* OB3b.

In these field tests, parental strain is separated from the rosette isolate and both are emplaced using an unsupplemented loading buffer or the buffer supplemented with additives. The filter consisting of the parental strain works successfully for only 2 days when unsupplemented and about 4 days when supplemented, while the rosette cluster isolate works efficiently for over 8 weeks.

The laboratory test performed with rosette clusters confirmed these results. They did show, that an emplaced in situ biofilter worked successfully for more than 8 weeks.

What is claimed is:

1. A biofilter suitable for emplacement into a contaminated groundwater aquifer for biodegradation of a water contaminant comprising a bacteria cell biomass wherein said bacteria are able to biodegrade the contaminant and the biofilter has a half-life and longevity of at least 8 weeks.

2. The biofilter of claim 1 wherein the bacterial cell biomass comprises a bacterial strain selected from the group of bacteria possessing an enzyme or enzymatic system able to biodegrade the contaminant.

3. The biofilter of claim 2 wherein the bacterial strain possesses oxygenase or monooxygenase system.

4. The biofilter of claim 3 wherein the enzyme is methane monooxygenase and bacteria is methanotrophic.

5. The biofilter of claim 4 wherein the bacteria is *Methylosinus trichosporium* OB3b rosette cluster forming isolate.

6. The biofilter of claim 5 wherein the *Methylosinus trichosporium* rosette isolate is pregrown on nitrate minimal salt medium lacking copper to the cell biomass having a density necessary to extent a half-life of the biofilter for at least 8 weeks.

7. The biofilter of claim 6 emplaced in the aquifer by suspending the cell biomass in injection medium substituted with magnesium salts, ferrous salts and with agar.

8. A biofilter suitable for emplacement into a contaminated groundwater aquifer for biodegradation of a water contaminant comprising a bacterial cell biomass wherein the bacteria are able to biodegrade the contaminant and have a stable isolate having more pronounced metabolic characteristics in connection with said contaminant than a general pure strain of said bacteria and the biofilter has a half-life and longevity of at least 8 weeks.

9. The biofilter of claim 8 wherein the bacterial cell biomass comprises a bacterial strain selected from the group of bacteria possessing an enzyme or enzymatic system able to biodegrade the contaminant.

10. The biofilter of claim 9 wherein the bacterial strain possesses oxygenase or monooxygenase system.

11. The biofilter of claim 10 wherein the enzyme is methane monoxygenase and bacteria is methanotrophic.

12. The biofilter of claim 11 wherein the bacteria is *Methylosinus trichosporium* OB3b rosette cluster-forming isolate.

13. The biofilter of claim 12 wherein the *Methylosinus trichosporium* rosette isolate is pregrown on nitrate minimal salt medium lacking copper to the cell biomass having a density necessary to extend a half-life of the biofilter for at least 8 weeks.

14. The biofilter of claim 13 emplaced in the aquifer by suspending the cell biomass in injection medium substituted with magnesium salts, ferrous salts and with agar.

15. The biofilter of claim 8 wherein said isolate has rosette-forming characteristics.

16. A biofilter suitable for emplacement into a contaminated groundwater aquifer for biodegradation of a water contaminant comprising a bacterial cell biomass wherein the bacteria are able to biodegrade the contaminant and have a stable isolate having rosette-forming characteristics and the biofilter has a half-life and longevity of at least 8 weeks.

17. The biofilter of claim 16 wherein the bacterial cell biomass comprises a bacterial strain selected from the group of bacteria possessing an enzyme or enzymatic system able to biodegrade the contaminant.

18. The biofilter of claim 17 wherein the bacterial strain possesses oxygenase or monooxygenase system.

19. The biofilter of claim 18 wherein the enzyme is methane monoxygenase and bacteria is methanotrophic.

20. The biofilter of claim 19 wherein the bacteria is *Methylosinus trichosporium* OB3b rosette cluster-forming isolate.

21. The biofilter of claim 20 wherein the *Methylosinus trichosporium* rosette isolate is pregrown on nitrate minimal salt medium lacking copper to the cell biomass having a density necessary to extend a half-life of the biofilter for at least 8 weeks.

22. The biofilter of claim 21 emplaced in the aquifer by suspending the cell biomass in injection medium substituted with magnesium salts, ferrous salts and with agar.

23. The biofilter of claim 16 wherein said isolate has rosette-forming characteristics.

\* \* \* \* \*